US012104800B2

(12) United States Patent
Cadima

(10) Patent No.: US 12,104,800 B2
(45) Date of Patent: Oct. 1, 2024

(54) COOKTOP APPLIANCE WITH A CANTILEVERED TEMPERATURE SENSOR

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 520 days.

(21) Appl. No.: 17/412,546

(22) Filed: Aug. 26, 2021

(65) Prior Publication Data

US 2023/0061182 A1    Mar. 2, 2023

(51) Int. Cl.
*F24C 3/12* (2006.01)
*F24C 15/10* (2006.01)
*G01K 1/143* (2021.01)

(52) U.S. Cl.
CPC ............ *F24C 3/122* (2013.01); *F24C 15/107* (2013.01); *G01K 1/143* (2013.01)

(58) Field of Classification Search
CPC ........ F24C 3/126; F24C 15/107; F24C 3/122; G01K 1/143; G01K 1/16; G01K 2207/00
See application file for complete search history.

(56) References Cited

U.S. PATENT DOCUMENTS

| 3,100,995 | A  | 8/1963  | Woodward |
| 6,138,554 | A  | 10/2000 | Cole     |
| 10,222,070 | B2 | 3/2019  | Cadima   |
| 10,865,993 | B2 | 12/2020 | Bentley  |
| 2021/0239538 | A1 | 8/2021 | Cadima   |

FOREIGN PATENT DOCUMENTS

| CN | 204853578 U  | 12/2015 |
| CN | 110645596 A  | 1/2020  |
| JP | 2009144985 A | 7/2009  |
| JP | 2011075261 A | 4/2011  |
| KR | 101247895 B1 | 3/2013  |
| KR | 101670799 B1 | 11/2016 |
| KR | 101802776 B1 | 12/2017 |

*Primary Examiner* — Alfred Basichas
(74) *Attorney, Agent, or Firm* — Dority & Manning, P.A.

(57) ABSTRACT

A gas burner assembly includes a gas burner and a grate with a plurality of fingers positioned above the gas burner. The plurality of fingers include a sensor finger. The gas burner assembly also includes a temperature sensor mounted to the sensor finger of the plurality of fingers of the grate. The temperature sensor is thermally isolated from the sensor finger.

20 Claims, 27 Drawing Sheets

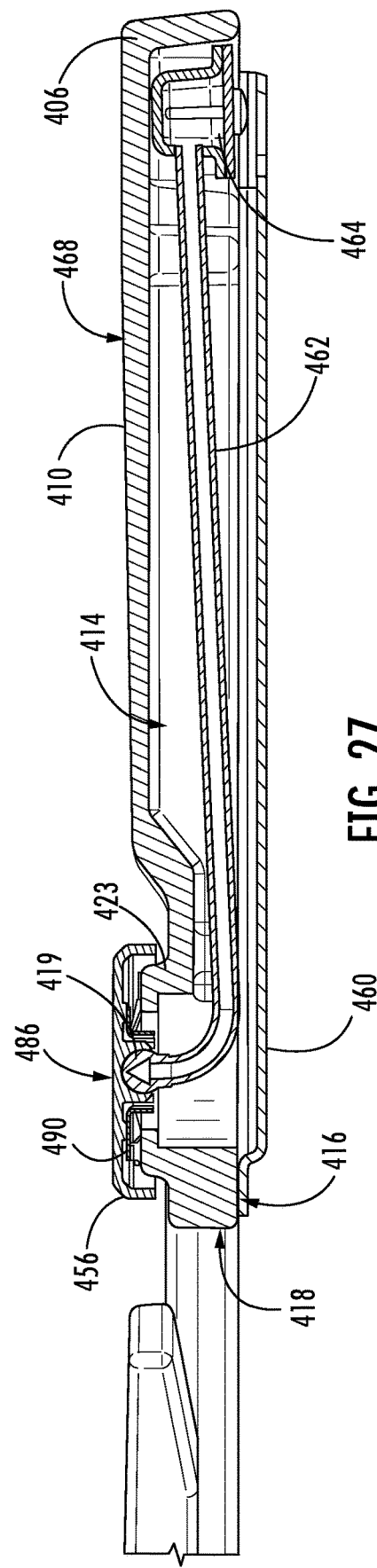

COOKTOP APPLIANCE WITH A CANTILEVERED TEMPERATURE SENSOR

FIELD OF THE INVENTION

The present subject matter relates generally to cooktop appliances with one or more gas burners, and in particular to such cooktop appliances with one or more temperature sensors therein.

BACKGROUND OF THE INVENTION

Gas cooktop appliances generally include a plurality of gas burners mounted at a top surface of the appliance. Gas burners heat a cooking utensil positioned on a grate over the gas burner primarily via convective heating. Thus, measuring cooking utensil temperatures on gas cooktop appliances poses challenges because any sensor that contacts the cooking utensil is significantly heated by swirling heated air from the gas burner.

Some gas cooktops include a sensor that passes through the gas burner and presses against the cooking utensil on the grate. Such sensors have drawbacks. For example, assembly and cleaning of burner parts is greatly complicated due to the construction of the gas burner that includes a sensor passing through the gas burner. As another example, openings in the gas burner and other cooktop components that accommodate the sensors can undesirably pass spills through the gas burner. Such temperature sensors also generally include sensitive electronics which may not be robust for a cooking environment, e.g., due to spills or dripping from the cooking surface which may contaminate the sensor. Additionally, such temperature sensors may not be robust for cleaning, e.g., the temperature sensor may not be suitable for submersion during washing or washing in a dishwasher appliance.

Accordingly, a gas cooktop appliance with features for measuring or monitoring the heating provided would be useful. In particular, a gas cooktop appliance with robust, durable features for measuring a temperature of a cooking utensil thereon would be useful.

BRIEF DESCRIPTION OF THE INVENTION

Aspects and advantages of the invention will be set forth in part in the following description, or may be apparent from the description, or may be learned through practice of the invention.

In an example embodiment, a gas burner assembly includes a gas burner and a grate with a plurality of fingers positioned above the gas burner. The plurality of fingers include a sensor finger. The gas burner assembly also includes a temperature sensor mounted to the sensor finger of the plurality of fingers of the grate. The temperature sensor is thermally isolated from the sensor finger.

In another example embodiment, a cooktop appliance includes a top panel with a gas burner disposed on the top panel. The cooktop appliance also includes a grate with a plurality of fingers. The grate is positioned above the gas burner. The plurality of fingers includes a sensor finger. The cooktop appliance also includes a temperature sensor mounted to the sensor finger of the plurality of fingers of the grate. The temperature sensor is thermally isolated from the sensor finger.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 27 provides a section view of the grate and temperature sensor of FIG. 26 in a loaded position.

DETAILED DESCRIPTION

Figure 1:
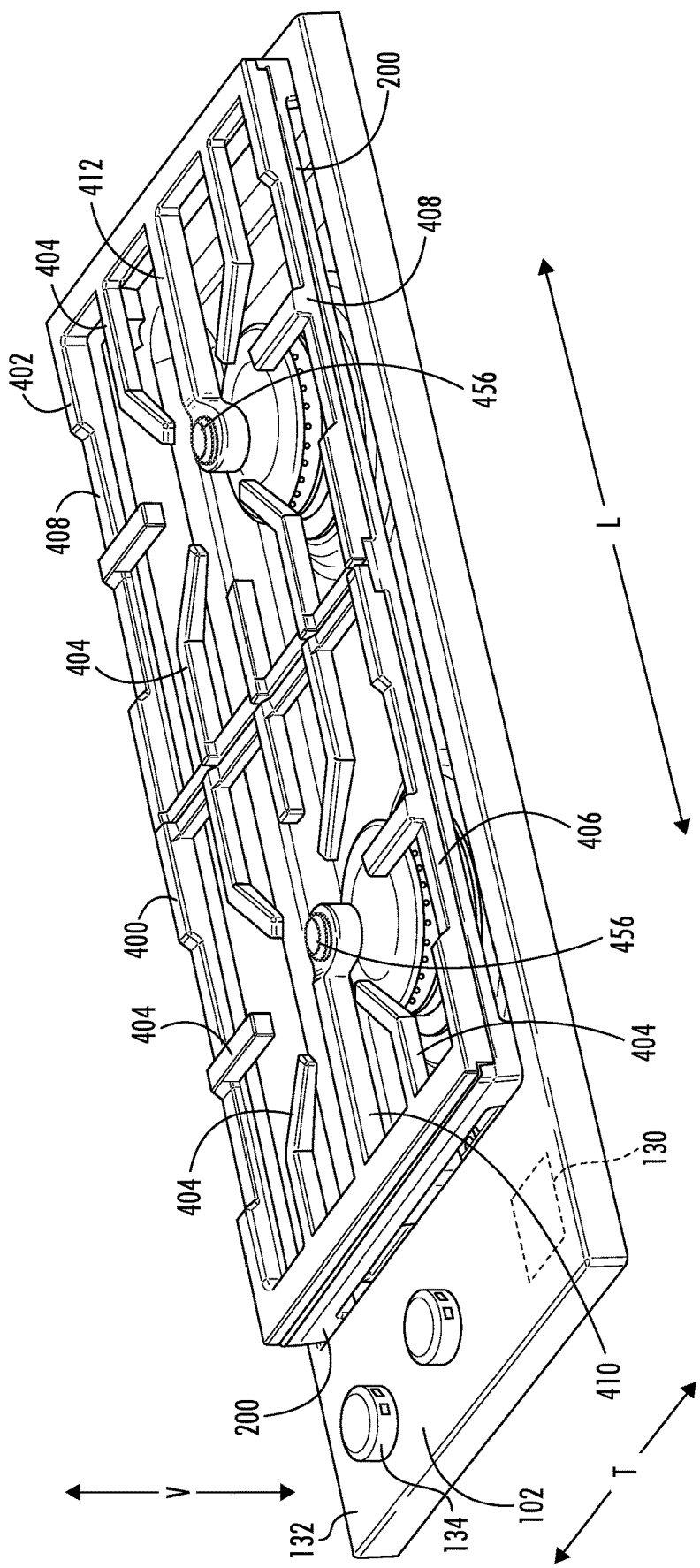
FIG. 1 provides a perspective view of a cooktop appliance according to one or more example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
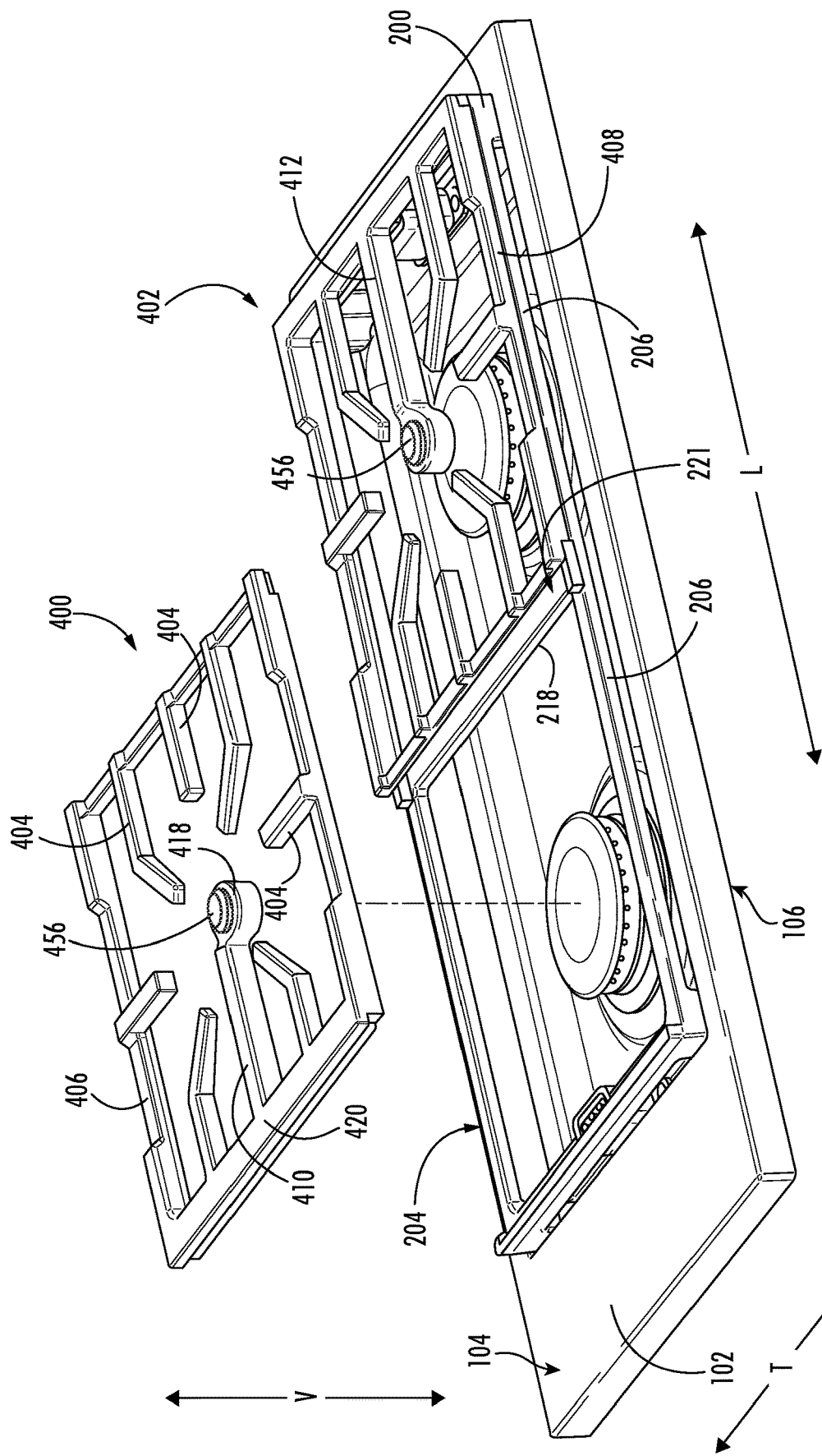
FIG. 2 provides a partially exploded view of the example cooktop appliance of FIG. 1.
Figure 3:
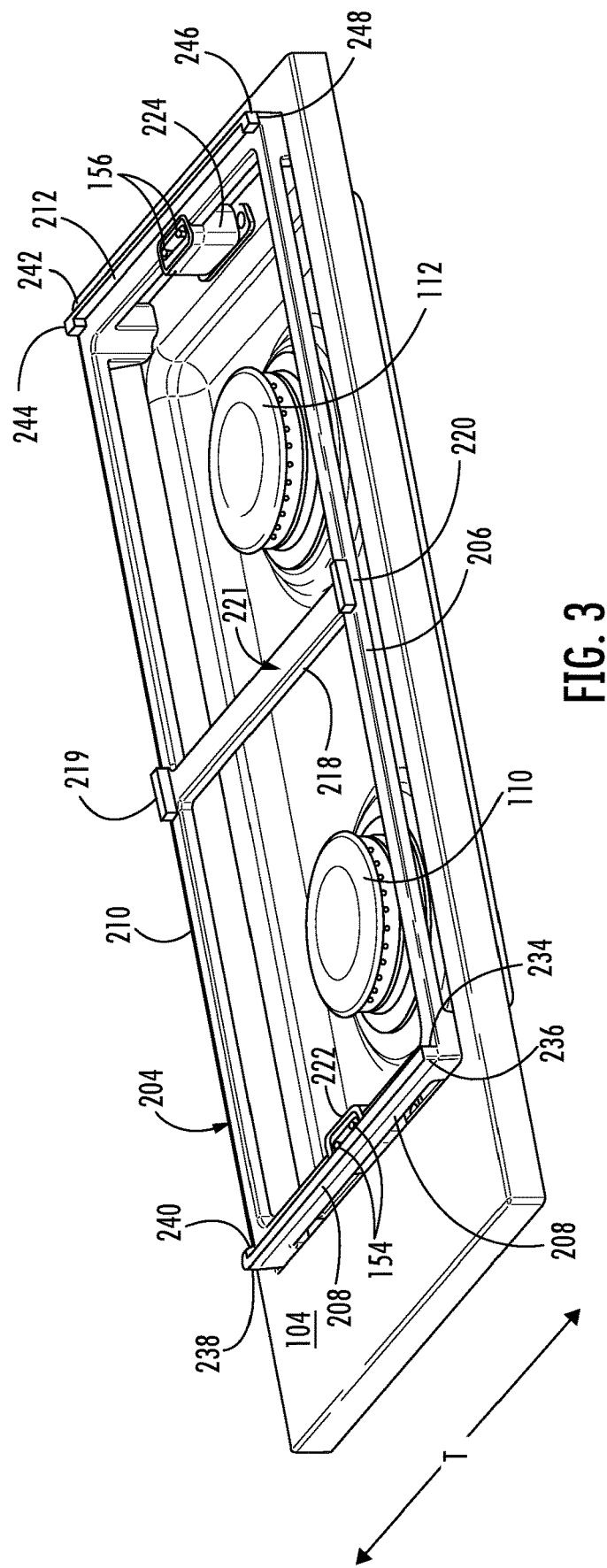
FIG. 3 provides a perspective view of the example cooktop appliance of FIG. 1 with the grates removed.
Figure 4:
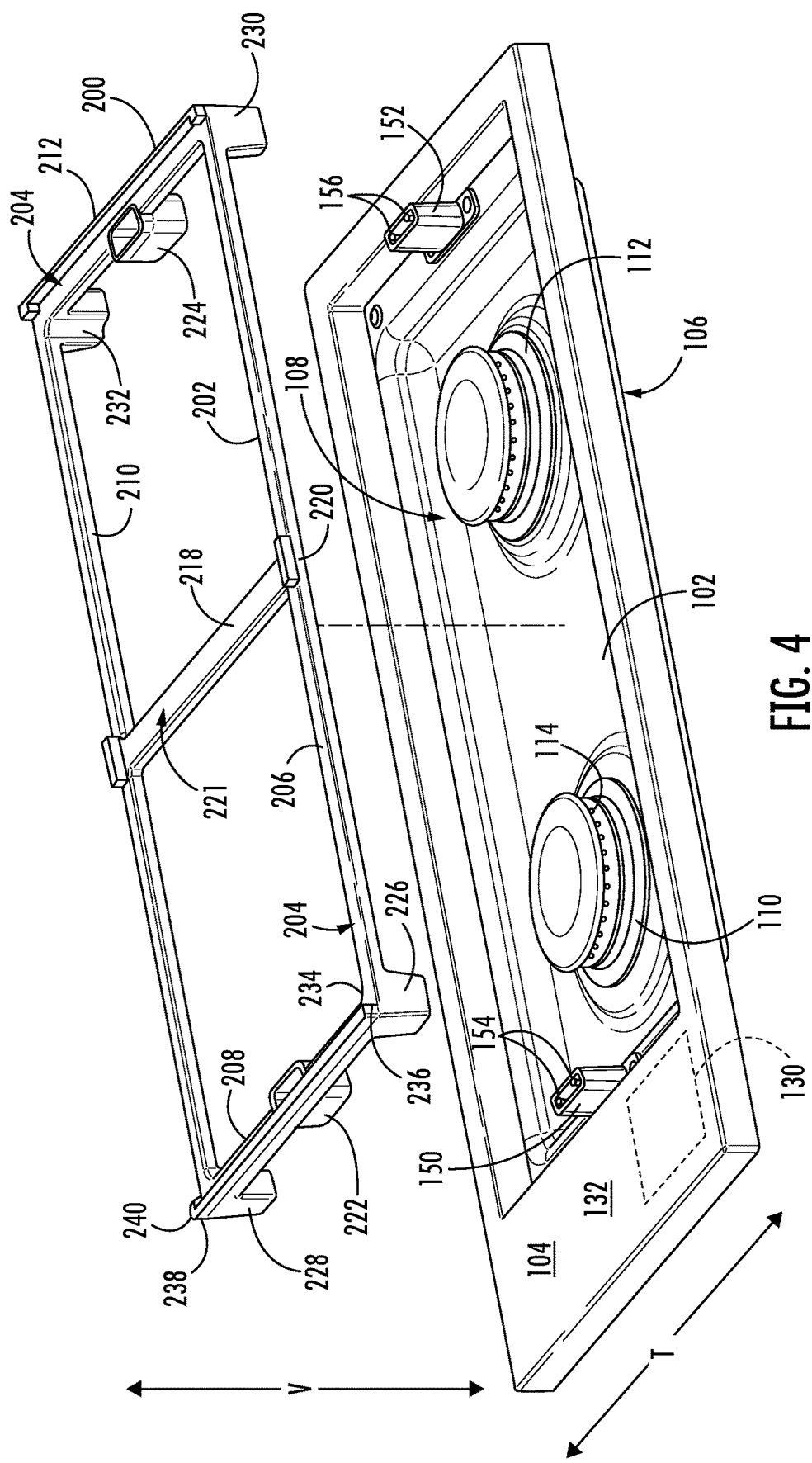
FIG. 4 provides a partially exploded view of the example cooktop appliance of FIG. 3.
Figure 5:
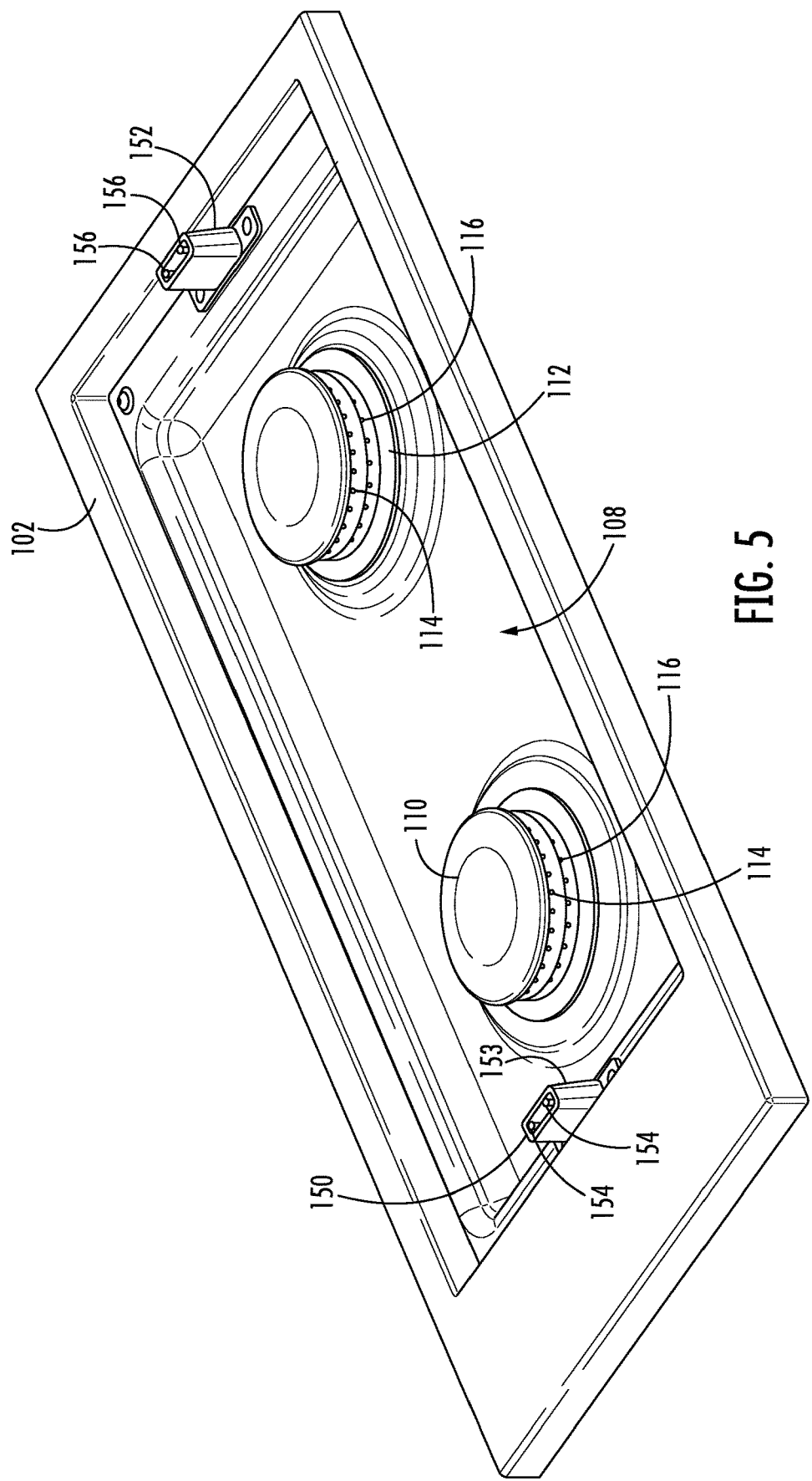
FIG. 5 provides a perspective view of a top panel with burners and pogo pin terminal blocks disposed thereon, such as may be incorporated into a cooktop appliance according to one or more embodiments of the present disclosure.

FIGS. 1 through 5 illustrate an exemplary a cooktop appliance 100 according to one or more example embodiments of the present disclosure. The example cooktop appliance 100 includes a top panel 102. The cooktop appliance 100 extends in a lateral direction L and a transverse direction T, e.g., perpendicular to a vertical direction V. Each of the vertical direction V, lateral direction L, and transverse direction T is mutually perpendicular to every other of the vertical direction V, the lateral direction L, and the transverse direction T, such that an orthogonal direction system is formed. More particularly, FIG. 1 depicts the exemplary cooktop appliance 100 with a frame 200 mounted on the panel 102 and a pair of grates 400, 402 mounted on the frame 200, while FIG. 2 depicts the exemplary cooktop appliance 100 with the first grate 400 lifted off of the frame 200, and FIG. 3 depicts the panel 102 and frame 200 with both grates 400 and 402 of the pair of grates 400, 402 removed. FIG. 4 depicts the exemplary cooktop appliance 100 with the frame 200 lifted off of the panel 102, and FIG. 5 depicts the panel 102 with the frame 200 and grates 400, 402 all removed. The panel 102 may include a top surface 104 and a bottom surface 106. By way of example, the panel 102 may be constructed of enameled steel, stainless steel, glass, ceramics, and combinations thereof.

As may be seen, e.g., in FIGS. 1 through 5, the cooktop appliance 100 may include a plurality of burners. For example, the cooktop appliance 100 may include a first burner 110 disposed on the top panel 102 and a second burner 112 spaced apart from the first burner 110 on the top panel 102. For example, as illustrated, the first burner 110 and the second burner 112 may be aligned along the transverse direction T and spaced apart along the lateral direction L. In additional embodiments, the cooktop appliance 100 may include any suitable number and arrangement of burners, including burners of varying sizes and shapes. The panel 102 may also include a recessed portion 108, e.g., which extends downward along the vertical direction V. The burners, e.g., first and second burners 110 and 112, may be positioned within the recessed portion 108. The recessed portion 108 may collect spilled material, e.g., foodstuffs, during operation of the cooktop appliance.

The cooktop appliance 100 may also include a user interface panel 132 located within convenient reach of a user of the cooktop appliance 100. In various embodiments, the user interface panel 132 may include user inputs 134, such as knobs, buttons, or a touchscreen, etc., which are generally understood by those of ordinary skill in the art and are therefore not shown or described in extensive detail herein for the sake of brevity and clarity. The user inputs 134 may allow the user to activate one or more burners and determine an amount of heat provided by each gas burner. The user interface panel 132 may also be provided with one or more graphical display devices that deliver certain information to the user, e.g., whether a particular burner is activated and/or the output level at which the burner is set.

Operation of the cooktop appliance 100 can be regulated by a controller 130 that is operably coupled to (i.e., in operative communication with) the user inputs and/or gas burners. For example, in response to user manipulation of the user input(s), the controller 130 operates one or more of the burners 110, 112. By way of example, the controller 130 may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In some embodiments, the processor may execute programming instructions stored in non-transitory memory. For example, the instructions may include a software package configured to operate appliance 100 and execute an operation routine such as one or more methods of operating the cooktop appliance 100. The memory may be a separate component from the processor or may be included onboard within the processor. The controller 130 may be programmed to operate the cooktop appliance 100 by executing instructions stored in memory. For example, the instructions may be software or any set of instructions that when executed by the processing device, cause the processing device to perform operations. Controller 130 may be configured to perform a variety of computer-implemented functions and/or instructions (e.g. performing methods, steps, calculations and the like and storing relevant data). It should be noted that controllers 130 as disclosed herein are capable of and may be operable to perform any methods and associated method steps as may be disclosed herein.

The controller 130 may be disposed in a variety of locations throughout appliance 100. Input/output ("I/O") signals may be routed between the controller 130 and various operational components of appliance 100, such as the gas burners 110, 112, inputs, a graphical display, one or more sensors, and/or one or more alarms.

Generally, each gas burner 110, 112 includes a generally circular shape from which a flame may be emitted. In additional embodiments, one or more of the burners may have a different shape, such as oval, oblong, obround, etc., among other possible shapes. As shown, each gas burner 110, 112 includes a plurality of fuel ports 114 defined perimetrically, e.g., circumferentially, therearound. Each fuel port 114 is in fluid communication with an internal passage of each respective burner 110, 112. In some embodiments, e.g., as illustrated in FIG. 5, one or both of the first burner 110 and the second burner 112 may be a multi-ring burner. For example, as illustrated in FIG. 5, the first burner 110 may include a first plurality of fuel ports 114 defining a first ring of the burner 110 and a second plurality of fuel ports 116 defining a second ring of the burner 110. In such embodiments, a first fuel chamber in fluid communication with the first plurality of fuel ports 114 may be separated from a second fuel chamber in fluid communication with the second plurality of fuel ports 116 by a wall within the burner 110, and the burner may be configured to selectively supply fuel to one or both of the fuel chambers. In some embodiments of a cooktop appliance, multiple burners of differing types may be provided in combination, e.g., one or more single-ring burners as well as one or more multi-ring burners. Moreover, other suitable burner configurations are also possible.

The controller 130 may be in operative communication with one or more temperature sensors. For example, as will be described in more detail below, the controller 130 may be selectively in operative communication with one or more embedded temperature sensors 450 in one or more grates 400, 402 via pogo pin terminal blocks positioned on, e.g., mounted to, the panel 102. In some embodiments, the cooktop appliance 100 may therefore include a first pogo pin terminal block 150 and a second pogo pin terminal block 152.

Figure 6:
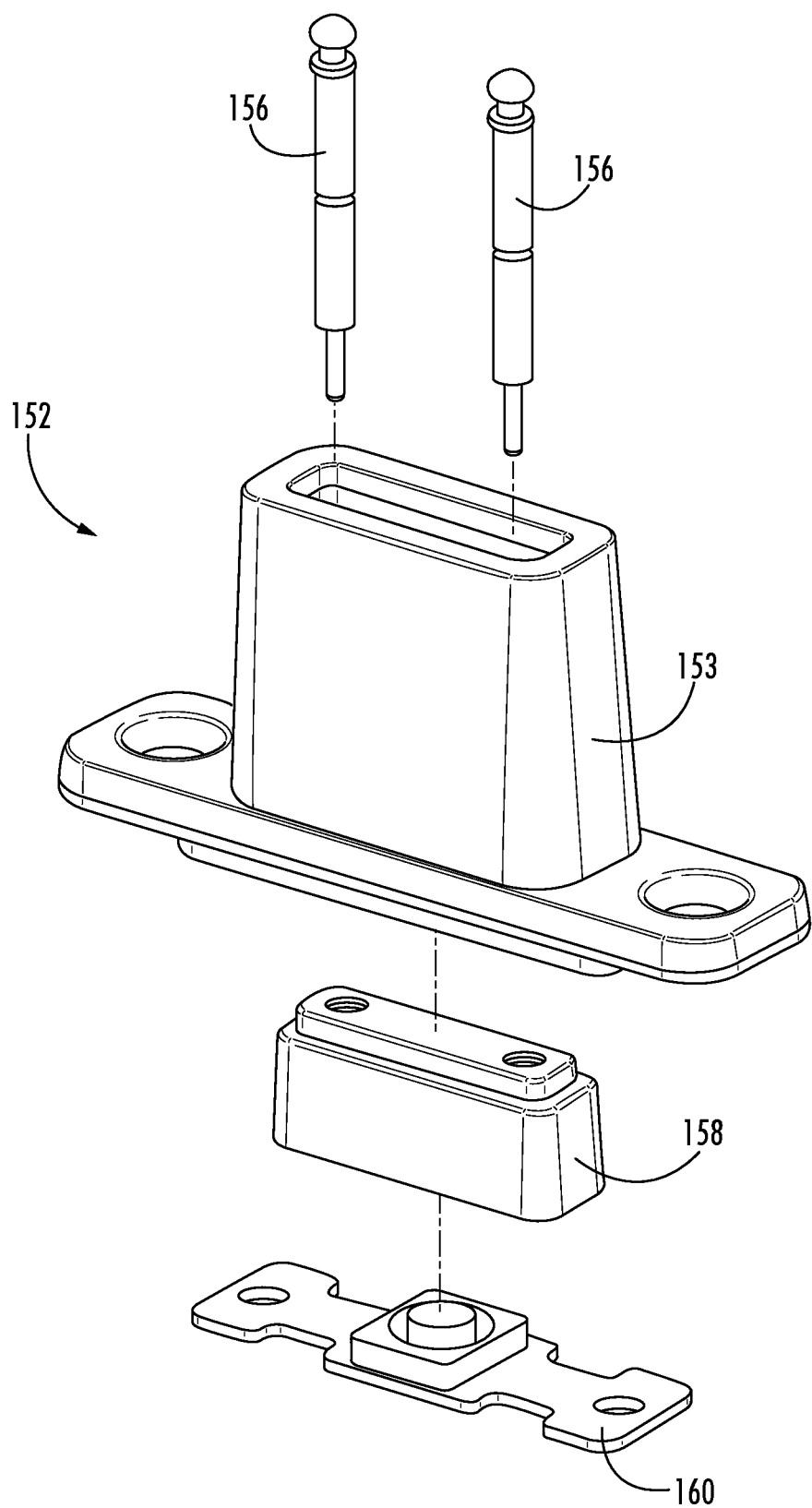
FIG. 6 provides an exploded view of a pogo pin terminal block such as may be incorporated into a cooktop appliance according to one or more embodiments of the present disclosure.

As best seen in FIGS. 5 and 6, the first and second connectors 154 and 156 of the first pogo pin terminal block 150 and second pogo pin terminal block 152 may be positioned in a housing 153 mounted on the panel 102, e.g., where the housing 153 is on and extending from the top surface 104 of the panel 102, such that the housing 153 elevates the respective connectors 154, 156 of each pogo pin terminal block 150 or 152 above the top surface 104 of the panel 102 and away from the recessed portion 108 where spills collect. Also as illustrated in FIG. 6, each pogo pin terminal block 150, 152 may include a connector block 158 and a baseplate 160. Only the second pogo pin terminal block 152 is illustrated in FIG. 6, although it should be understood that the first and second pogo pin terminal blocks 150 and 152 are substantially identical, e.g., apart from their respective locations.

In some embodiments, the first pogo pin terminal block 150 may be positioned on the panel 102 adjacent to the first burner 110 and the second pogo pin terminal block 152 may be positioned on the panel 102 adjacent to the second burner 112. For example, the first pogo pin terminal block 150 may be positioned opposite the second burner 112, e.g., about the first burner 110, along the lateral direction L, and the second pogo pin terminal block 152 may be positioned opposite the first burner 110, e.g., about the second burner 112, along the lateral direction L. As mentioned above, the first burner 110 and the second burner 112 may be aligned with each other along the transverse direction T. In such embodiments, the first pogo pin terminal block 150 may be aligned with the first burner 110 along the transverse direction T and the second pogo pin terminal block 152 may be aligned with the second burner 112 along the transverse direction T. Thus, in some embodiments, the first burner 110 and the second burner 112 may be aligned with each other and with the first pogo pin terminal block 150 and the second pogo pin terminal block 152 along the transverse direction T.

The first pogo pin terminal block 150 and the second pogo pin terminal block 152 may each include one or more connectors, such as two spring loaded pins or two contact pads, or more than two pins/pads. For example, the first pogo pin terminal block 150 may include first connectors 154, e.g., two spring-loaded pins 154 in the illustrated example embodiment, and the second pogo pin terminal block 152 may include second connectors 156, e.g., a second set of two spring-loaded pins 156, where the illustrated spring-loaded pins are an example embodiment of first and second connectors 154 and 156 of the first and second pogo pin terminal blocks 150 and 152. In some embodiments, the first connectors 154 and the second connectors 156 may be positioned above the first burner 110 and the second burner 112 along the vertical direction V. In some embodiments, the first connectors 154 and the second connectors 156 may be positioned outside of, e.g., above along the vertical direction V, the recessed portion 108 of the panel 102. Thus, the connectors 154 and 156 may be protected from spillage, e.g., by positioning the connectors 154 and 156 above the recessed portion 108 of the panel 102 and/or by enclosing the connectors 154 and 156, where example embodiments of enclosing the connectors 154 and 156 will be described below.

The cooktop appliance 100 may also include a frame 200 which may be mounted, such as removably mounted, to the top surface 104 of the panel 102. The frame 200 may be configured to selectively support two or more grates 400, 402 (FIGS. 1 and 2) over the first burner 110 and the second burner 112.

The frame 200 may thusly be positioned above the first burner 110 and the second burner 112, e.g., along the vertical direction V. For instance, in some embodiments, the frame 200 may span the two burners 110 and 112, e.g., the frame 200 may consist of a single piece spanning unsupported across the first burner 110 and the second burner 112.

The frame 200 may include a first sleeve 222 which encloses the first connectors 154 of the first pogo pin terminal block 150 on four sides when the frame 200 is mounted to the top surface 104 of the panel 102 and a second sleeve 224 which encloses the second connectors 156 of the second pogo pin terminal block 152 on four sides when the frame 200 is mounted to the top surface 104 of the panel 102.

For example, the frame 200 may include or consist of four corners, and may have a leg extending generally along the vertical direction V at each corner. The sleeves 222 and 224 of the frame 200 may be positioned between the corners, e.g., between the legs. The legs of the frame 200 may be positioned on panel 102, e.g., may extend from an outer rail 202 of the frame 200 to the top surface 104 of panel 102 when the frame 200 is mounted on the panel 102. In some embodiments, the frame 200 may include a first leg 226 and a second 228 leg positioned opposite the first leg 226 along the transverse direction T. For example, the first leg 226 and the second leg 228 may be aligned with the first sleeve 222 along the transverse direction T with the first sleeve 222 positioned between the first leg 226 and the second leg 228. In some embodiments, the frame 200 may further include a third leg 230 and a fourth leg 232 positioned opposite the third leg 230 along the transverse direction T. For example, the third leg 230 and the fourth leg 232 may be aligned with the second sleeve 224 along the transverse direction T with the second sleeve 224 positioned between the third leg 230 and the fourth leg 232.

The first leg 226 and the second leg 228 may be disposed on the frame 200 opposite the third leg 230 and fourth leg 232 along the lateral direction L. In some embodiments, the frame 200 may span unsupported across the first burner 110 and the second burner 112, e.g., without any legs or other portions of the frame 200 resting on the panel 102 between the legs 226, 228, 230, and 232, and/or between the burners 110 and 112, along the lateral direction L. The first burner 110 and the second burner 112 may be positioned between the first leg 226 and the third leg 230 along the lateral direction L when the frame 200 is mounted to the top surface 104 of the panel 102. For example, the burners 110 and 112 may be between the first pair of legs, e.g., the first and second legs 226 and 228, and the second pair of legs, e.g., the third and fourth legs 230 and 232, along the lateral direction L.

As mentioned, the frame 200 may include an outer rail 202. The outer rail 202 of the frame may extend around a perimeter of the frame, such as completely around the entire perimeter of the frame 200 and may define a peripheral support surface 204, e.g., for at least partially supporting the grates 400, 402 thereon. For example, the peripheral support surface 204 may be configured to selectively support a first grate 400 on a first portion, e.g., half, of the peripheral support 204 surface and a second grate 402 on a second portion, e.g., a second half, of the peripheral support surface 204 adjacent to the first portion.

In some embodiments, the outer rail 202 of the frame 200 comprises a front portion 206, a left side portion 208, a back portion 210 parallel to the front portion 206, and a right side portion 212 parallel to the left side portion 208. The front portion 206 and the back portion 210 may be spaced apart by the left side portion 208 and the right side portion 212, e.g., the back portion 210 may be positioned at an opposite end of each of the left side portion 208 and the right side portion 212 from the front portion 206. The left side portion 208 and the right side portion 212 may each extend perpendicular to the front portion 206 and the back portion 210. For example, the left side portion 208 may extend from a left end 234 of the front portion 206 at a front end 236 of the left side portion 208 to a back end 238 of the left side portion 209. The back portion 210 may extend from the back end 238 of the left side portion 208 at a left end 240 of the back portion 210 to a back end 242 of the right side portion 212 at a right end 244 of the back portion 210. The right side portion 212 may extend from the back end 242 of the right side portion 212 to a front end 246 of the right side portion 212 at a right end 248 of the front portion 206.

The frame 200 may also include a crossbar 218 extending through the frame 200 at about the middle of the frame 200. For example, the crossbar 218 may extend from a midpoint 220 of the front portion 206 to a midpoint 219 of the back portion 210. In some embodiments, the peripheral support surface 204 may be defined along the front portion 206, the left side portion 208, the back portion 210, and the right side portion 212, and the crossbar 218 may define an intermediate support surface 221. The intermediate support surface 221 may be configured to selectively support the first grate 400 at a first side of the intermediate support surface 221 and the second grate 402 at a second side of the intermediate support surface 221.

The frame 200 may be formed of cast metal, such as cast iron or steel, such that the outer rail 202, cross-bar 218, legs 226, 228, 230, and 232, and sleeves 222 and 224 are formed from a single, seamless piece of metal. Frame 200 may be removable from panel 102, e.g., by lifting upwardly on the frame 200.

Moreover, it is understood that further additional or alternative embodiments of the frame 200 may be placed over only one burner assembly or more than two burner assemblies.

As shown in FIGS. 1 and 2, in some embodiments, the cooktop appliance includes one or more grates, e.g., the frame 200 may be configured to receive and support a first and second selectively removable grates 400 and 402. Each grate 400 and 402 may extend at least partially above a corresponding burner 110, 112 when the grates 400 and 402 are in a mounted position on the frame 200 and the frame 200 is mounted on the panel 102. Generally, each grate 400, 402 is configured for supporting a cooking utensil, such as a pot, pan, etc., on top of the grate 400 and/or 402 when the grates 400 and 402 are in the mounted position on the frame 200.

For example, each grate 400 and 402 of the exemplary embodiment includes a plurality of fingers 404, e.g., formed of cast metal, such as cast iron. The cooking utensil may be placed on the fingers 404 of one of the grates 400 and 402 such that the cooking utensil rests on a top surface 468 of some or all of the fingers of the plurality of fingers 404. The first grate 400 may include a first outer frame 406 that extends around or defines a perimeter of the first grate 400. The second grate 402 may include a second outer frame 408 that extends around or defines a perimeter of the second grate 402. Thus, each outer frame 406, 408 may be disposed at an outer portion of the respective grate 400 or 402. The fingers 404 of each grate 400 and 402 may extend from the respective outer frame 406 or 408.

When mounted, the grates 400, 402 may selectively rest on the frame 200, such as on the peripheral support surface 204 and the intermediate support surface 221 thereof. For example, the first outer frame 406 may be supported by the left side portion 208, a left half of the front portion 206, a left half of the back portion 210, and a left side of the intermediate support surface 221. In such embodiments, the second outer frame 408 may be supported by the right side portion 212, a right half of the front portion 206, a right half of the back portion 210, and a right side of the intermediate support surface 221.

As shown, e.g., in FIG. 2, the grates 400 and 402 may be selectively removable (e.g., to an unmounted position), such that the grates 400 and 402 can be readily lifted from the frame 200.

The plurality of fingers 404 includes a first sensor finger 410 on the first grate 400 and a second sensor finger 412 on the second grate 402. Sensor fingers 410 and 412 each support a temperature sensor 450 that is operable to measure a temperature of a cooking utensil on the respective grate 400 or 402. The first sensor finger 410 is illustrated in FIGS. 7 through 10 and 15 through 27, and it should be understood that the second sensor finger 412 provides the same or similar, e.g., mirrored, features as those shown and described for first sensor finger 410. As may be seen in FIGS. 7 through 10 and 15 through 27, the first sensor finger 410 defines a slot 414 at a bottom surface 416 of the sensor finger 410. The slot 414 is open and faces downward, e.g., along the vertical direction V, such as towards the panel 102 when the grate 400 is in the mounted position on the panel 102. Thus, slot 414 is exposed and accessible at the bottom surface 416 of each sensor finger 410, 412.

Figure 7:
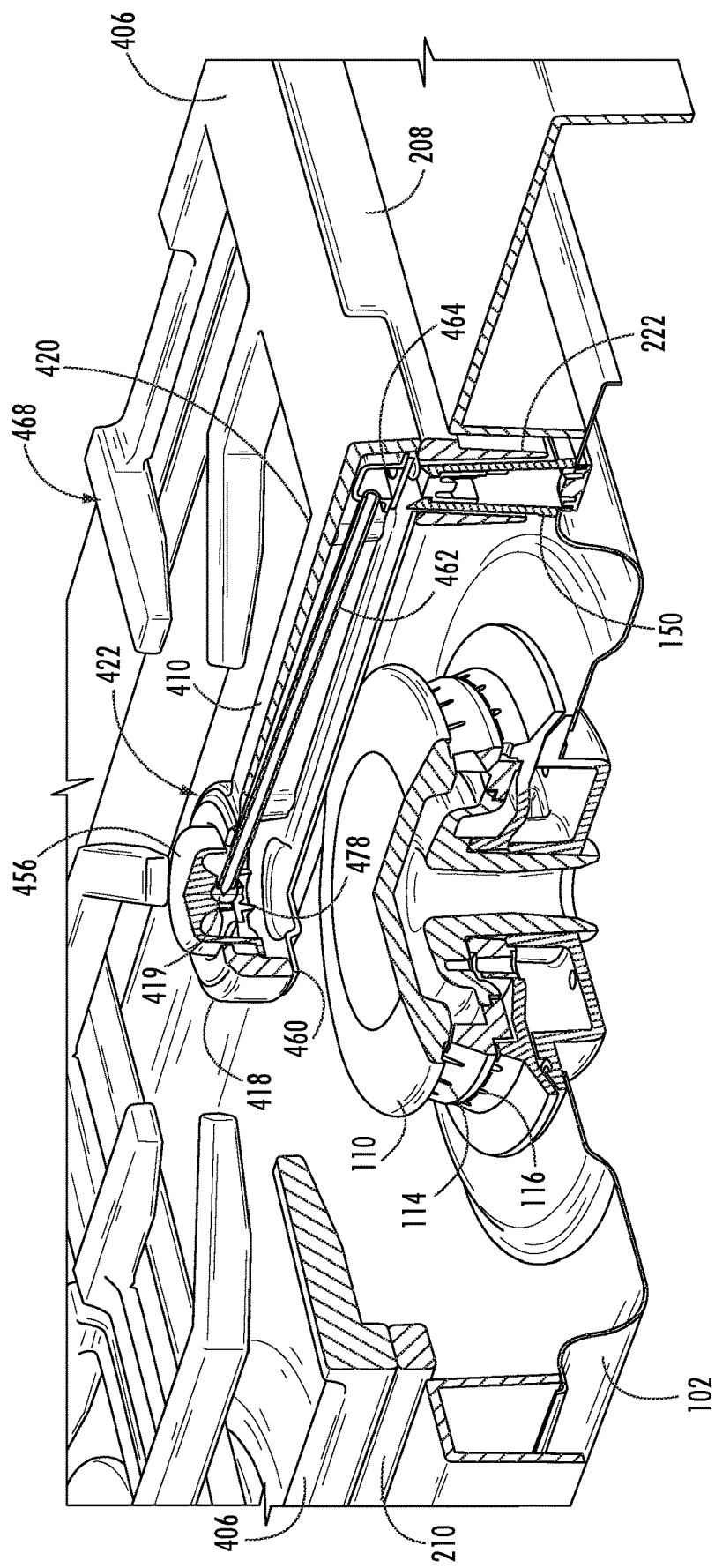
FIG. 7 provides a partially sectioned perspective view of an example grate having an embedded temperature sensor therein as may be incorporated into a cooktop appliance in one or more example embodiments of the present disclosure.
Figure 8:
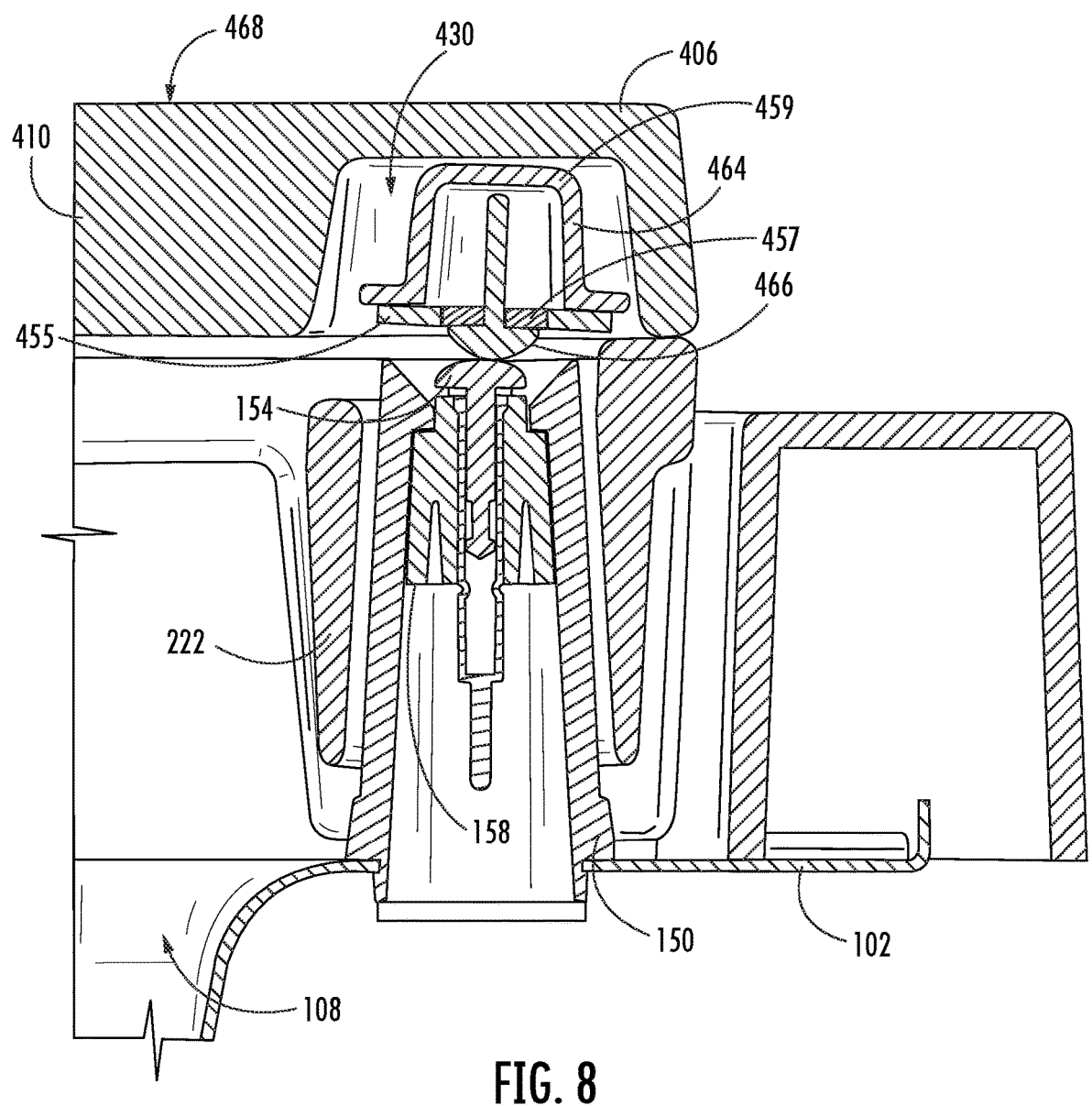
FIG. 8 provides a section view of a portion of the example cooktop appliance of FIG. 7.
Figure 19:
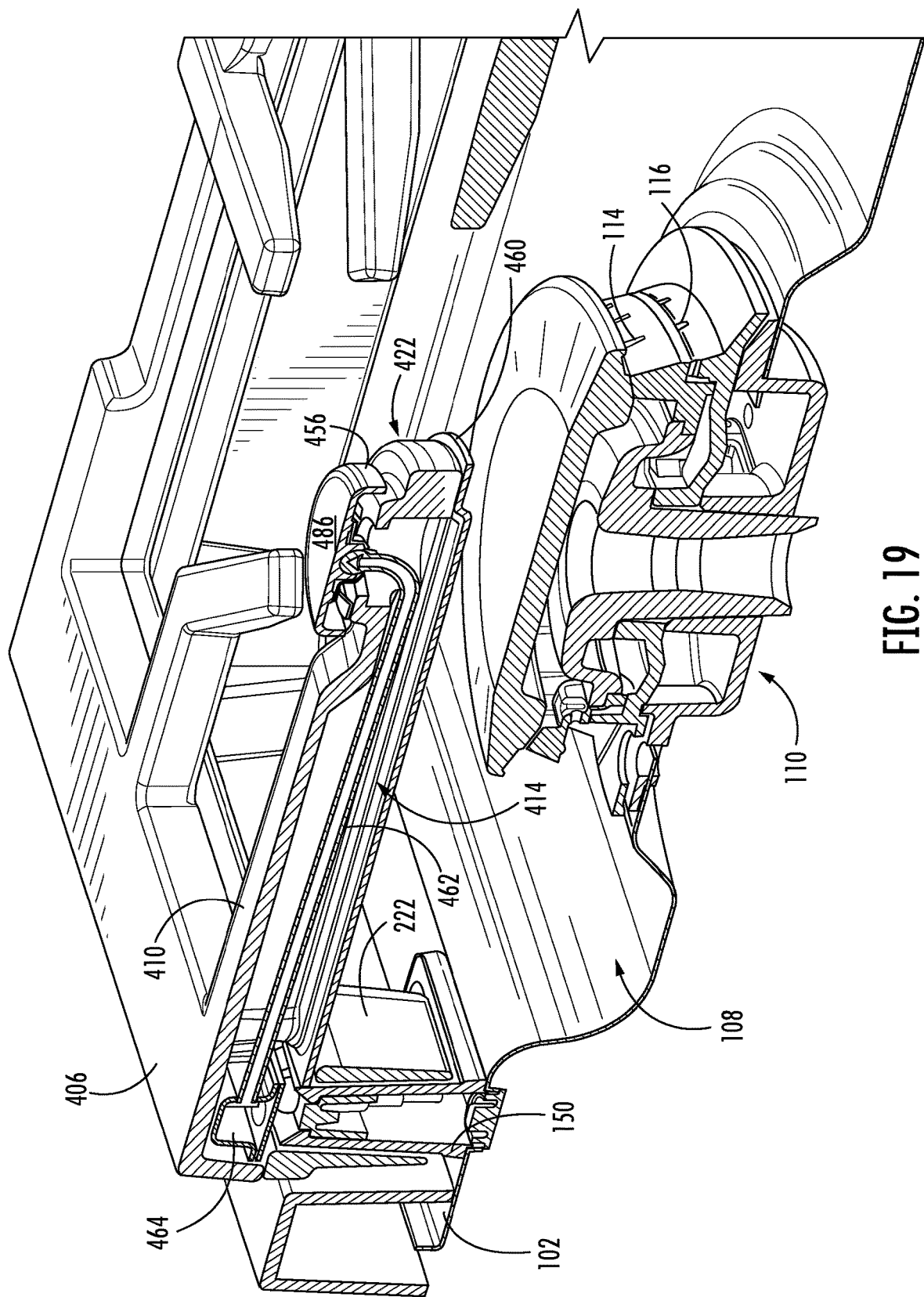
FIG. 19 provides a sectioned perspective view of an example grate having an embedded temperature sensor therein as may be incorporated into a cooktop appliance in one or more additional example embodiments of the present disclosure.
Figure 25:
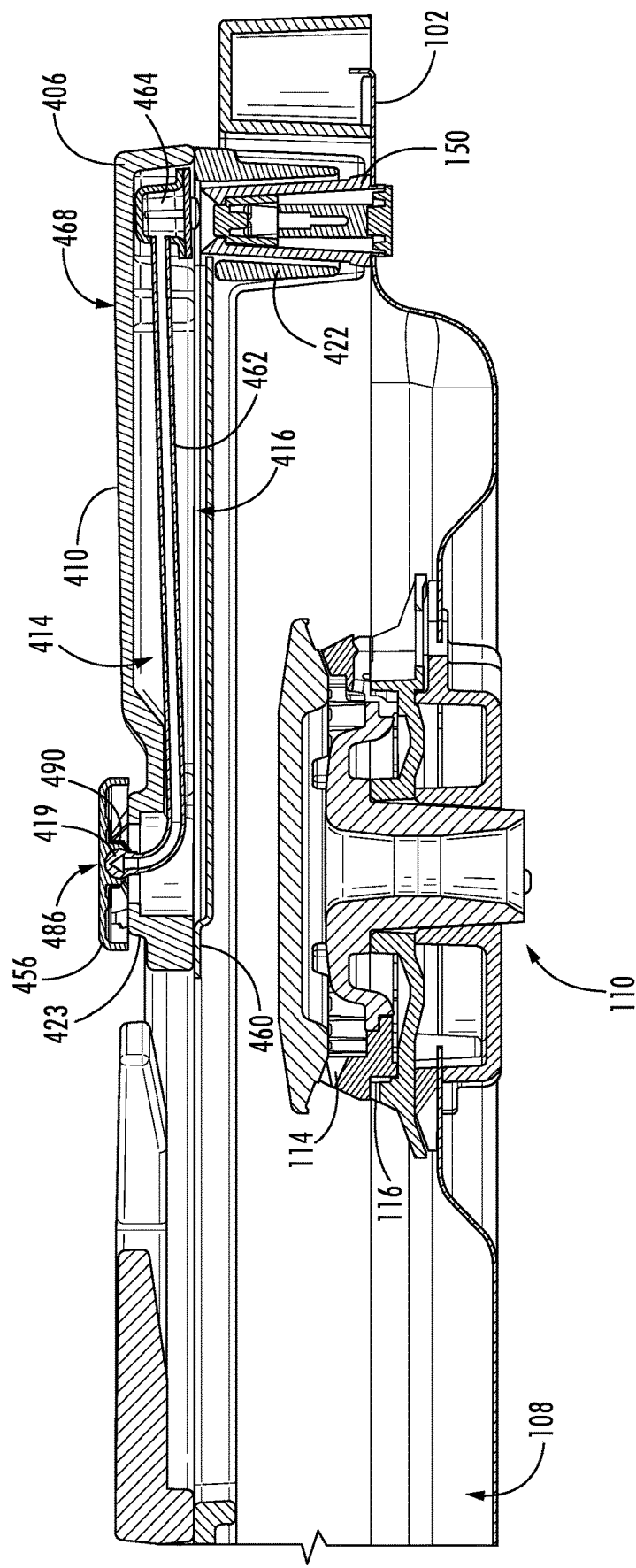
FIG. 25 provides a section view of a portion of cooktop appliance with the exemplary grate of FIG. 19 incorporated therein.

As best seen in FIGS. 7 through 11, the sensor finger 410 extends between a first end 418 and a second end 420. In some embodiments, sensor finger 410 may be elongated between the first and second ends 418, 420 of sensor finger 410. Second end 420 of sensor finger 410 may be positioned at the outer frame 406 of the grate 402. Conversely, first end 418 of sensor finger 410 may be spaced from the outer frame 406, and may be positioned above the corresponding gas burner 110 or 112 when the grate 400 or 402 is mounted on the frame 200, e.g., as illustrated in FIGS. 7, 19, and 25. Slot 414 may also extend between a first end 424 and a second end 426. First end 424 of slot 414 may be positioned at first end 418 of sensor finger 410, and second end 426 of slot 414 may be positioned at second end 420 of sensor finger 410. Thus, slot 414 may extend along the length of sensor finger 410.

Figure 9:
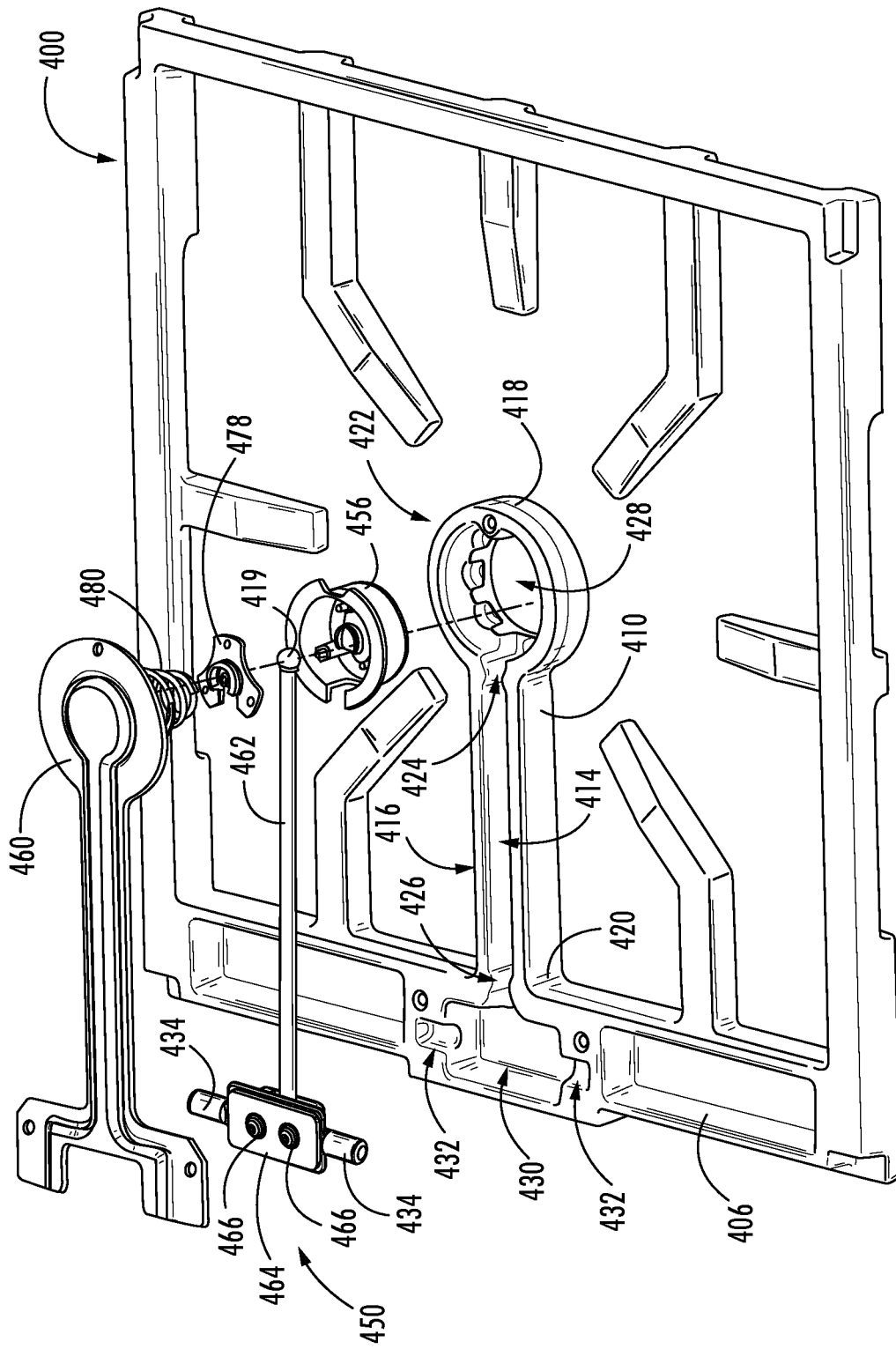
FIG. 9 provides an exploded view of an exemplary grate that may be incorporated into a cooktop appliance such as the cooktop appliance of FIG. 1.
Figure 10:
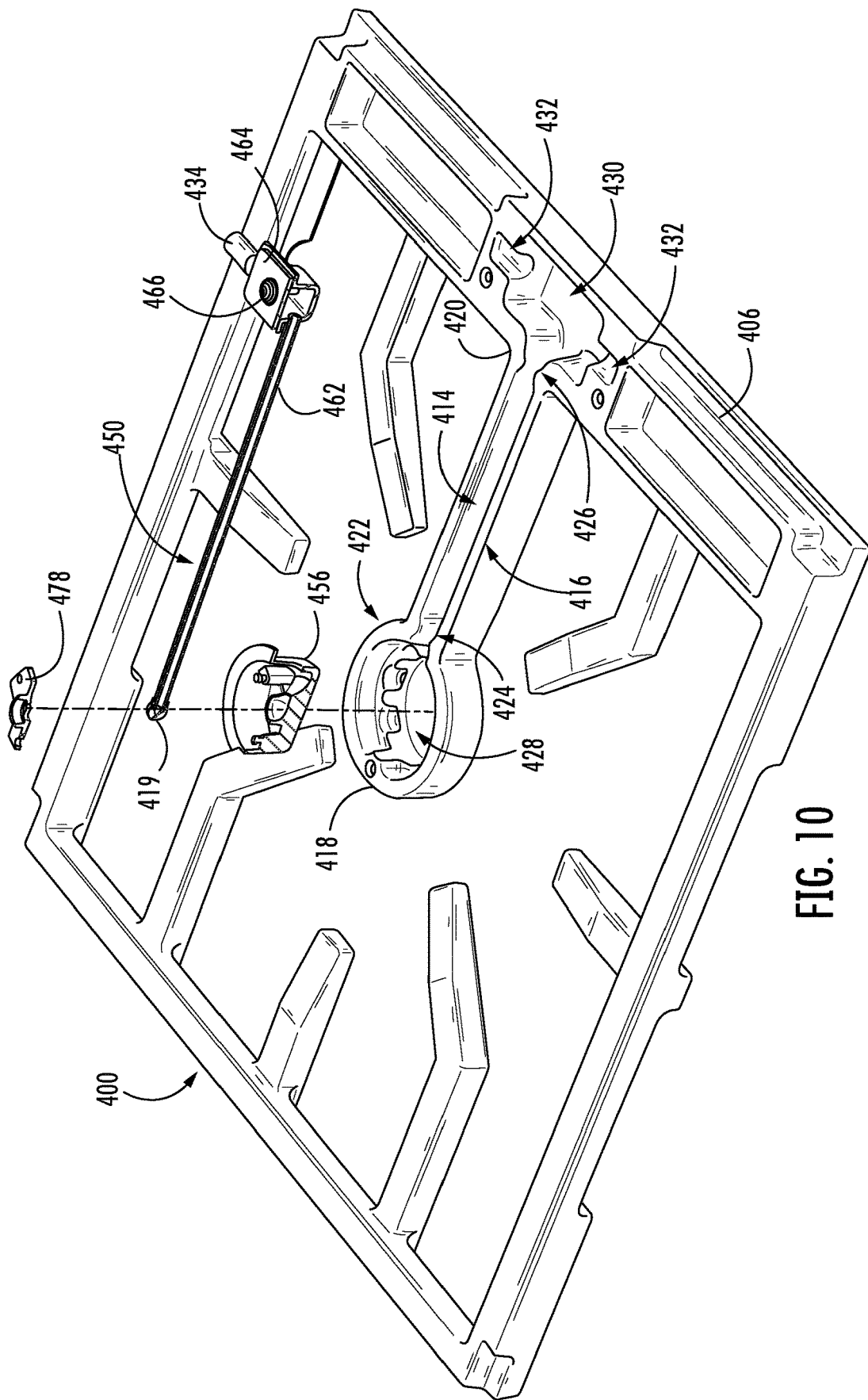
FIG. 10 provides a partially sectioned exploded view of the grate of FIG. 9.
Figure 11:
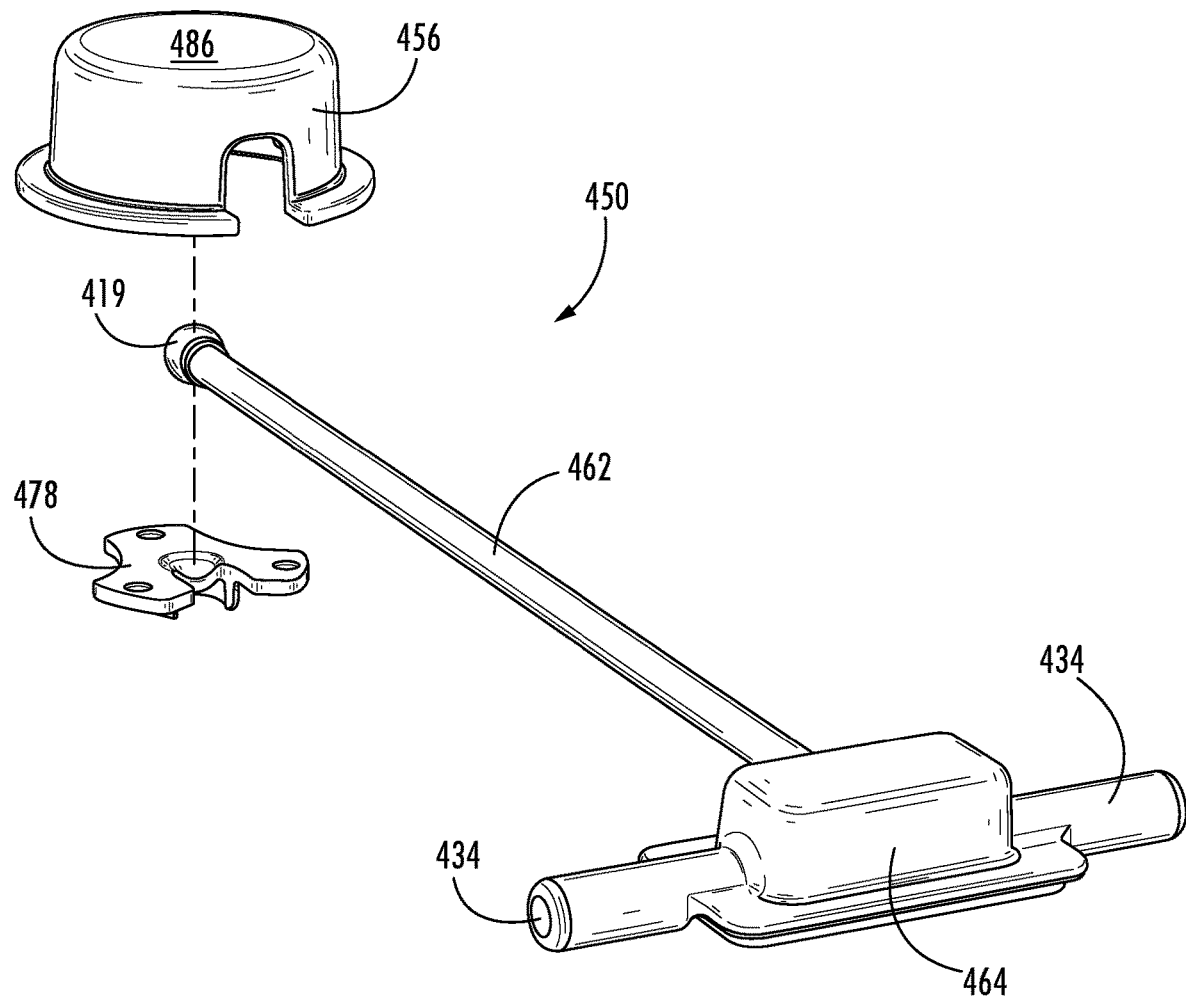
FIG. 11 provides an exploded top perspective view of a temperature sensor according to one or more example embodiments of the present disclosure.
Figure 12:
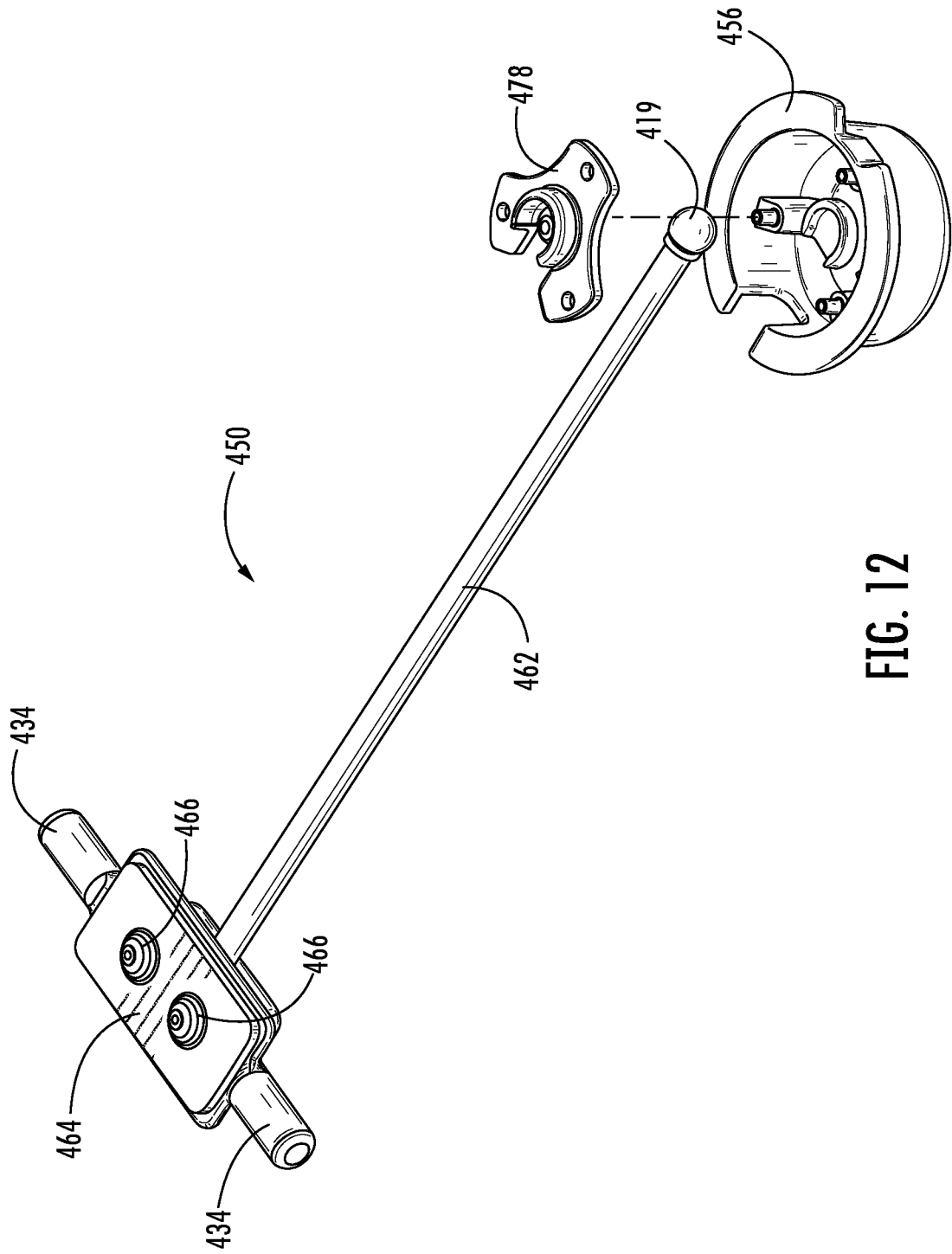
FIG. 12 provides an exploded bottom perspective view of the temperature sensor of FIG. 11.
Figure 13:
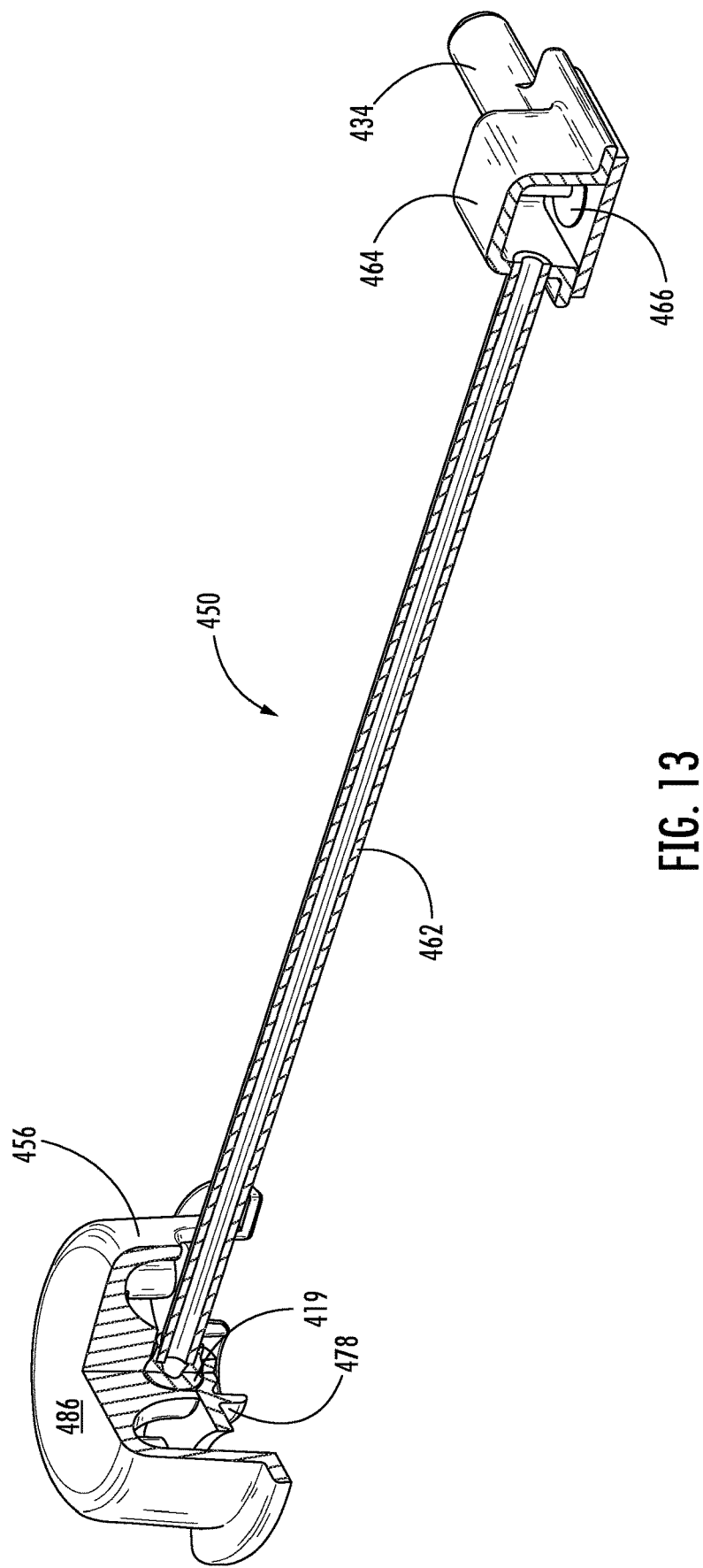
FIG. 13 provides a partially sectioned perspective view of the temperature sensor of FIG. 11.
Figure 14:
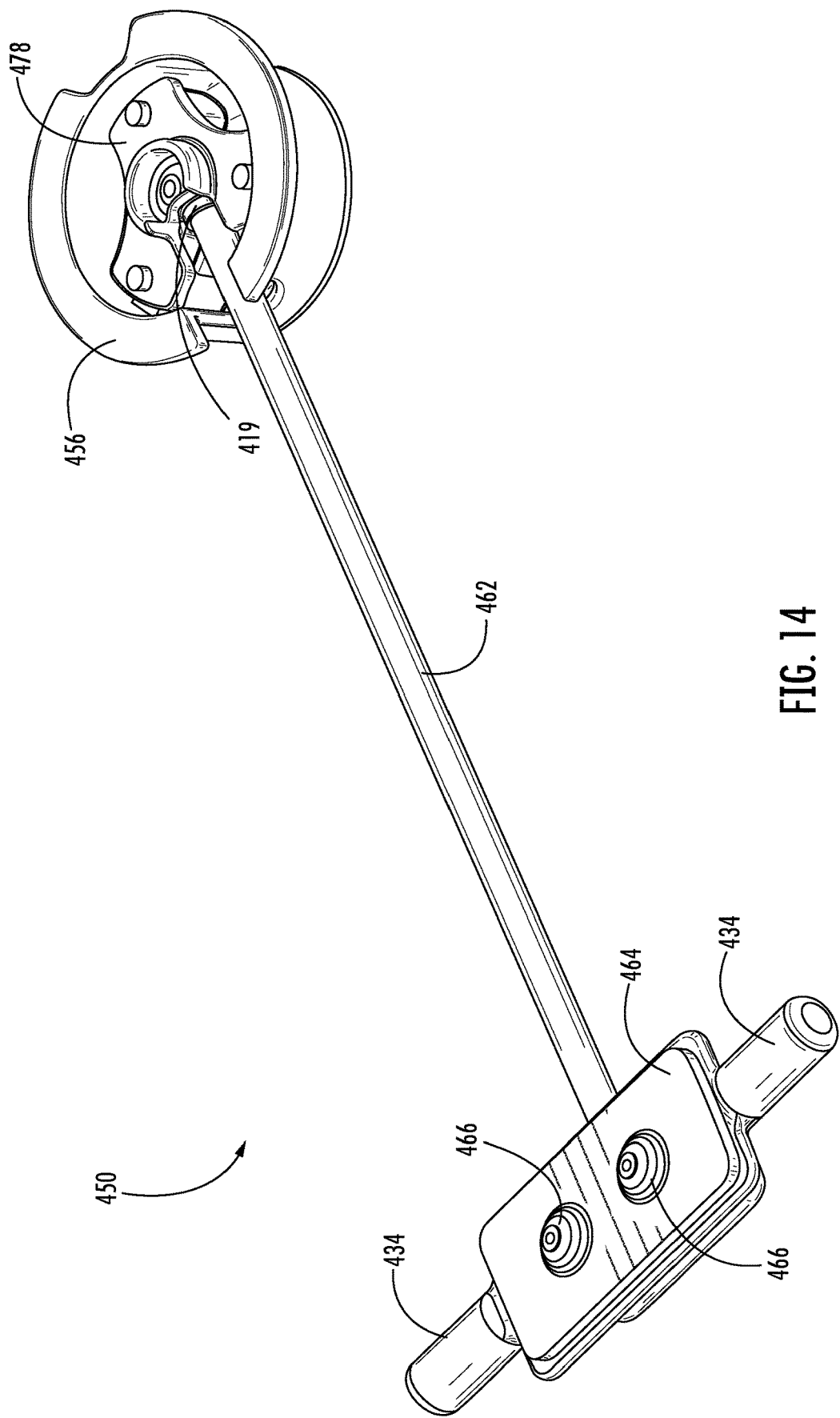
FIG. 14 provides a bottom perspective view of the temperature sensor of FIG. 11 in an assembled state.
Figure 20:
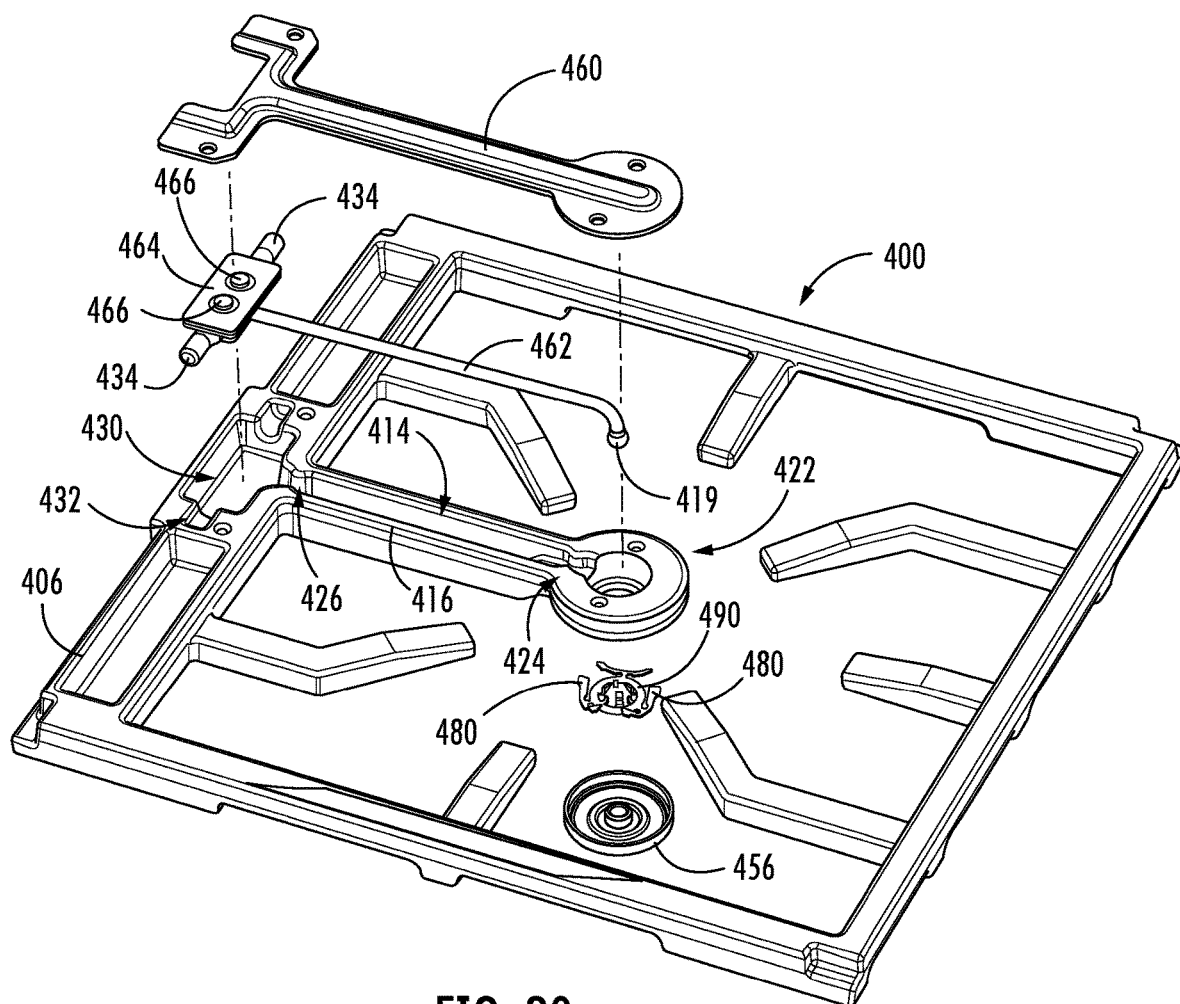
FIG. 20 provides an exploded view of the grate of FIG. 19.
Figure 21:
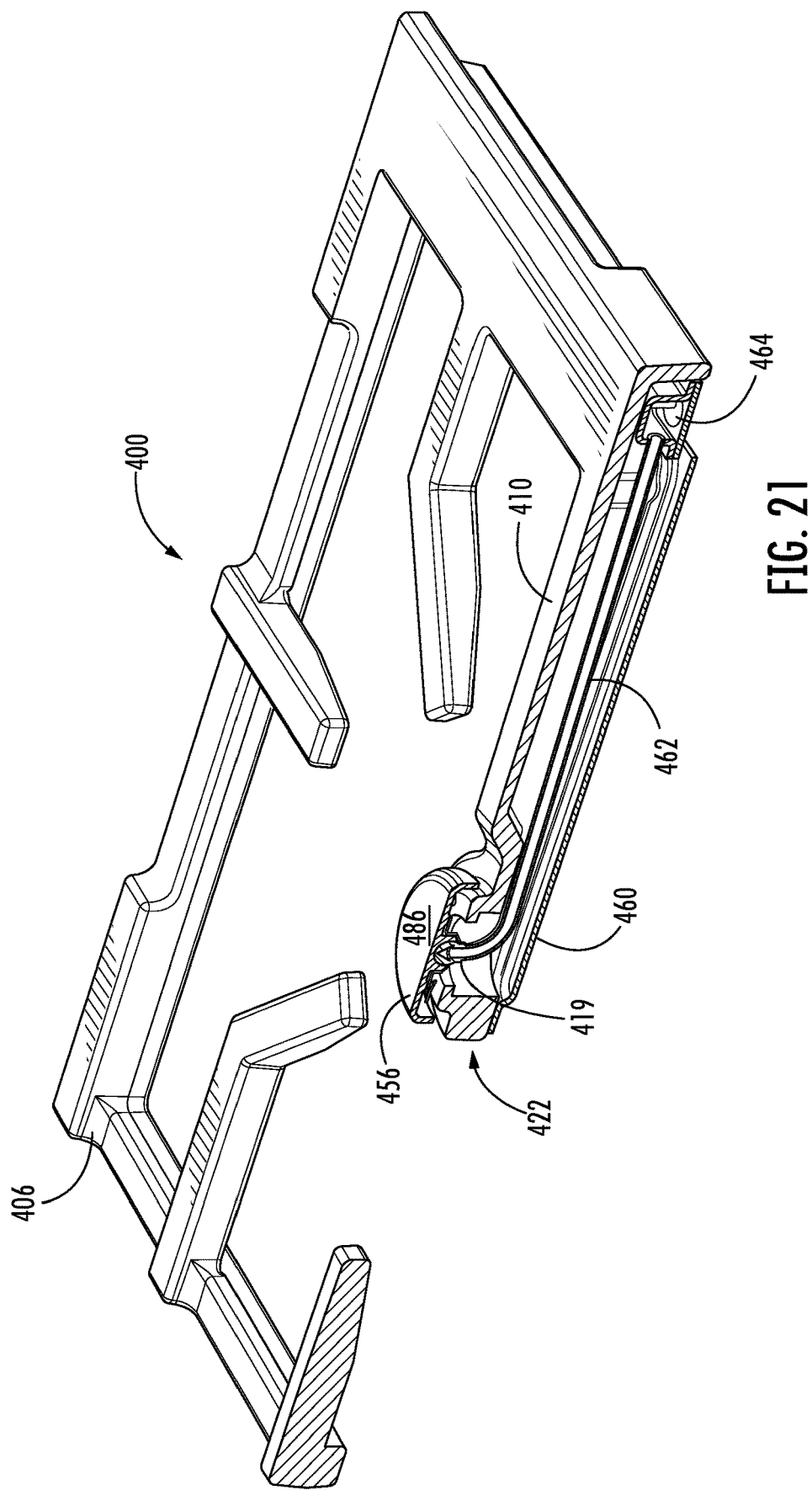
FIG. 21 provides a partially sectioned top perspective view of the grate of FIG. 19.

Temperature sensor 450 is mounted to sensor finger 410, e.g., at least partly within the slot 414 as mentioned above. For example, temperature sensor 450 may include a temperature probe 454 (see, e.g., FIG. 18) positioned at first end 418 of sensor finger 410 and/or first end 424 of slot 414. In particular, the sensor finger 410 may include a first end portion 422 proximate to the first end 418 (and including the first end 418), e.g., as indicated in FIGS. 9, 10, and 20, and the temperature sensor 450 and/or the temperature probe 454 thereof may be mounted in or at the first end portion 422 of the sensor finger 410. In particular, the temperature sensor 450 may include a rounded tip 419, e.g., the tip 419 may be ball-shaped and/or may be a partially spherical end (e.g., having the shape of a partial sphere or truncated sphere) of the temperature sensor 450. The rounded, e.g., partial spherical, tip 419 may include a conical or otherwise tapered recess 452 therein, e.g., as indicated in FIG. 18, and the temperature probe 454 may be mounted in the tapered recess 452 of the tip 419.

Figure 18:
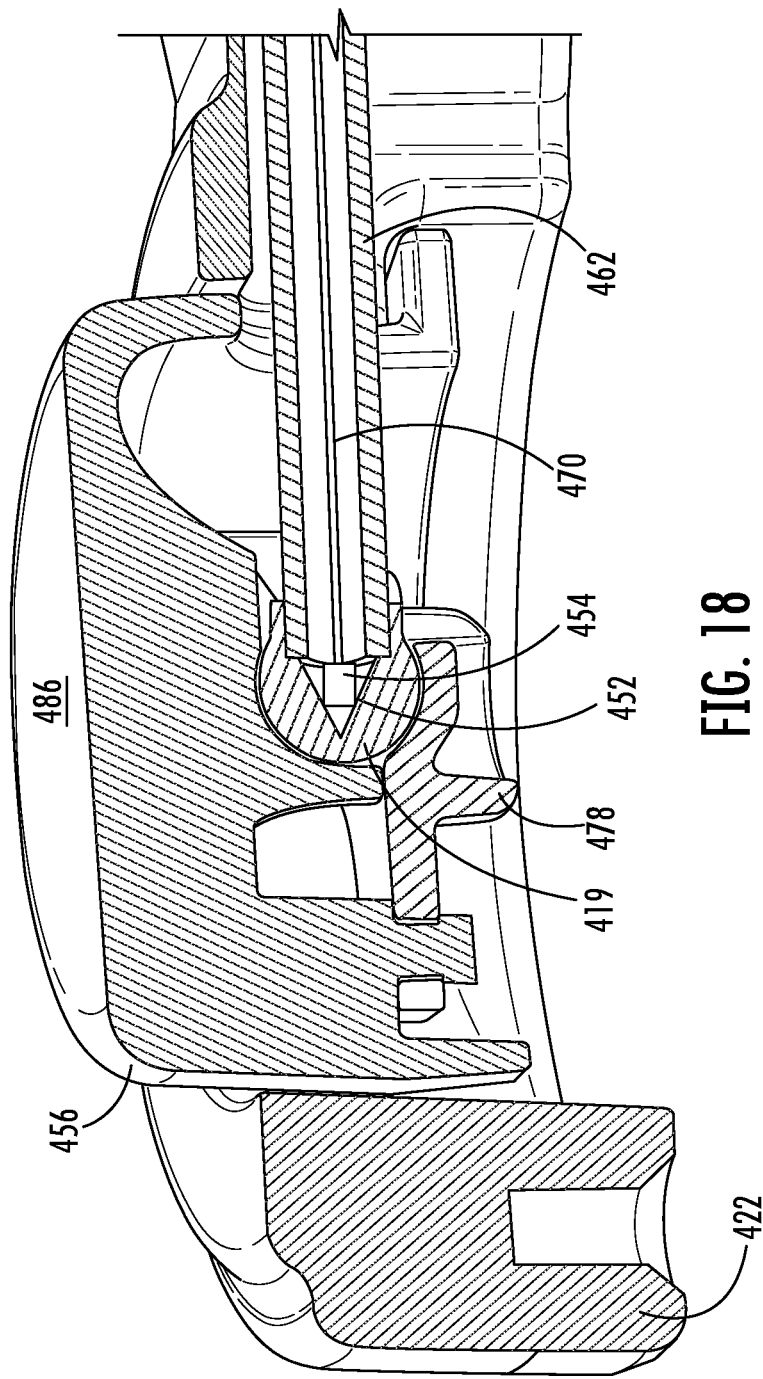
FIG. 18 provides an enlarged section view of a portion of a sensor finger and a temperature sensor embedded therein.

As may be seen, e.g., in FIG. 18, the temperature probe 454 may be coupled to a wire 470 and the wire 470 may urge the temperature probe 454 into the tapered recess 452, whereby the tapered recess 452 may provide precise and consistent (repeatable) location of the temperature probe 454 at or near a center of the first end portion 422 of the sensor finger 410 such that the temperature sensor 450, in particular the tip 419 and the probe 454 of the temperature sensor 450, may be positioned over gas burner 110 when the grate 400 is mounted on the frame 200. In particular, tapered recess 452, and the temperature probe 454 therein, may be directly above, e.g., along the vertical direction V, the burner 110, and/or may be positioned concentric with gas burner 110 on sensor finger 410. The temperature probe 454 may be or include a resistance temperature detector, a thermocouple, an infrared temperature sensor, a bimetallic switch, etc.

In some embodiments, the temperature sensor 450 may further include a heat transfer cap 456. The heat transfer cap 456 may comprise a heat conductive material, such as a metallic material, e.g., a cast aluminum alloy. The heat transfer cap 456 may be in direct contact with the tip 419 of the temperature sensor 450. Thus, the heat transfer cap 456 may be in conductive thermal communication with the tip 419 of the temperature sensor 450. In some embodiments, the heat transfer cap 456 may be in conductive thermal communication with the tip 419 and the temperature probe 454 therein. For example, the heat transfer cap 456 may be in direct contact with the tip 419, which is in turn in direct contact with the temperature probe 454, such that the heat transfer cap 456 is in conductive thermal communication with the temperature probe 454 via the tip 419.

A base cap or cover 460 may also be mounted to the sensor finger 410 within the slot 414 or adjoining the slot 414 at the bottom surface 416 of sensor finger 410. Cover 460 may be positioned between the temperature sensor 450 and gas burner 110, e.g., along the vertical direction V. Thus, cover 460 may advantageously shield temperature sensor 450 from direct heating by gas burner 110. For example, cover 460 may block direct radiative heat transfer from surfaces at gas burner 110 to the temperature sensor 450, and/or cover 460 may shield the temperature sensor 450 from direct convective heat transfer from gas burner 110.

In some embodiments, the temperature sensor 450 may further include a bottom cap 478. The bottom cap 478 may be joined to the heat transfer cap 456, such as fastened to the heat transfer cap 456. For example, in some embodiments, the bottom cap 478 may be fastened to the heat transfer cap 456 by deformable rivets, such as deformable rivets formed on the heat transfer cap 456 that are received in mating apertures in the bottom cap 478. As may be seen, e.g., in FIG. 9, prior to installation, the deformable rivets may be generally cylindrical in shape and may be sized to fit in and through the apertures in the bottom cap 478, such as the rivets in their initial state each having an outer diameter less than an inner diameter of each corresponding aperture. As may be seen, e.g., in FIG. 18, after installation the rivets may be, e.g., hammered, or otherwise flattened to expand the rivets and thereby secure the bottom cap 478 to the heat transfer cap 456, such as expanding a lower end of the rivet such that the outer diameter of the rivet at the lower end is greater than the diameter of the aperture through which the rivet extends, thereby securing the bottom cap 478 and the heat transfer cap 456 together.

In various embodiments, the tip 419 may be joined to the heat transfer cap 456 by a ball-and-socket joint. For example, in embodiments such as those illustrated in FIGS. 9 through 18, the tip 419 may be the ball in the ball-and-socket joint and the socket of the ball-and-socket joint may be defined in part by the heat transfer cap 456 and in part by the bottom cap 478. In additional embodiments, e.g., as illustrated in FIGS. 19 through 27, the socket may be formed by the heat transfer cap 456 alone, and the tip 419 may be secured in the socket by a snap ring 490. When the tip 419 is joined to the heat transfer cap 456 by a ball-and-socket joint, such connection may permit relative rotation of the heat transfer cap 456 and the tip 419. Thus, for example, such rotation may permit the heat transfer cap 456 to be levelled, such as when the heat transfer cap 456 is in contact with a cooking utensil 1000 (see, e.g., FIG. 17), in order to ensure complete and consistent contact between the heat transfer cap 456 and the bottom of the cooking utensil 1000, e.g., along and across the contact surface 486 of the heat transfer cap 456.

The partially spherical tip 419 may be coupled to or in operative communication with a biasing member or spring 480 (see, e.g., FIG. 9 and/or FIG. 22) such that the partially spherical tip 419 (and the temperature probe 454 therein) is urged upwardly. As mentioned, each finger of the plurality of fingers 404, including the sensor fingers 410 and 412, may include a top surface 468. Thus, the tip 419 may be urged towards the top surface 468 of the sensor finger 410, e.g., towards a utensil 1000 positioned thereon, by the spring 480. In particular, the heat transfer cap 456 may be urged upward along the vertical direction by the spring 480, e.g., towards a cooking utensil 1000 (FIG. 17) positioned on the grate 400. In some embodiments, e.g., as illustrated in FIG. 9, the biasing element may be a coil spring 480. In additional embodiments, the biasing element may also or instead include one or more leaf springs 480 on the snap ring 490.

Thus, temperature sensor 450 may be positioned in sensor finger 410 such that the temperature sensor 450 is configured to contact a cooking utensil 1000 and/or to be in conductive thermal communication with the cooking utensil 1000 via the heat transfer cap 456, such that the temperature sensor 450 is operable to measure and/or detect the temperature of the cooking utensil 1000 on the grate 400 when the cooking utensil 1000 is heated by the corresponding gas burner 110.

The heat transfer cap 456 may advantageously provide an enlarged contact surface 486 for contacting the underside of a cooking utensil and thereby promoting heat transfer from the cooking utensil 1000 to the temperature probe 454.

In some embodiments, the heat transfer cap 456 may be spaced apart from the grate 400, including the sensor finger 410 thereof, to prevent conductive heat transfer between the grate 400 and the sensor 450. For example, the heat transfer cap 456, in some embodiments, does not touch the grate 400. In some embodiments, the heat transfer cap 456 may be spaced apart from the grate 400 continuously around a circumference of the heat transfer cap 456, e.g., such that the entire perimeter, e.g., circumference, of the heat transfer cap 456 is not in contact with the sensor finger 410 (or any other part of the grate 400), as may be seen for example in FIGS. 15 and 16.

In some embodiments, the heat transfer cap 456 may define an outer dimension, such as an outer diameter, which is less than a corresponding dimension, e.g., an inner diameter (e.g., FIGS. 15, 16, and 18) or an outer diameter (e.g., FIGS. 19, 21-23, 26, and 27), of the sensor finger 410. For example, the sensor finger 410 may include an aperture 428 in the first end portion 422 thereof, and the heat transfer cap 456 may pass upwards along the vertical direction V through the aperture 428. As another example, the first end portion 422 of the sensor finger 410 may have a circular or cylindrical shape and the outer diameter of the first end portion 422 of the sensor finger 410 may be greater than the diameter of the heat transfer cap 456, whereby the first end portion 422 of the sensor finger 410 may at least partially block heat, e.g., direct convective heat, from the burner 110 from directly impacting the sensor 450, e.g., the heat transfer cap 456 thereof. Thus, in some embodiments, the first end portion 422 of the sensor finger 410 may define a first diameter (an inner diameter, e.g., of the aperture 428, or an outer diameter) and the heat transfer cap 456 may define a second diameter (outer diameter) which is less than the first diameter. In particular embodiments where the outer diameter of the heat transfer cap 456 is less than the inner diameter defined by the aperture 428 in the first end portion 422 of the sensor finger 410, a gap may thereby be defined between the heat transfer cap and the end portion 422, such as a circumferential gap extending around the entire perimeter, e.g., circumference, of the heat transfer cap 456.

Figure 26:
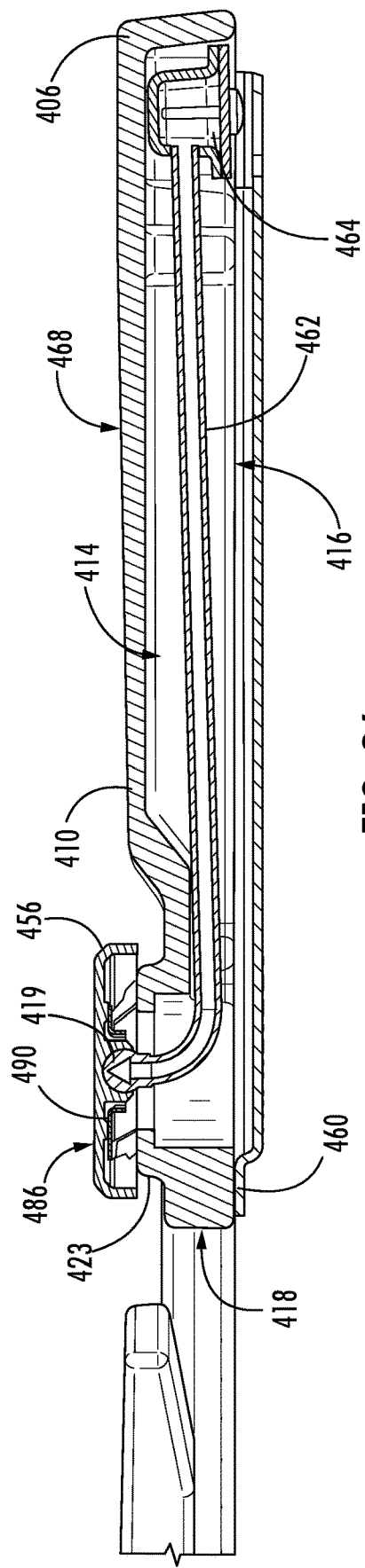
FIG. 26 provides a section view of a grate and a temperature sensor embedded therein in an unloaded position.

In some embodiments, e.g., as illustrated in FIGS. 25 through 27, the sensor finger 410 may include a raised shoulder 423. The sensor finger 410 may be protected from spills in order to prevent or minimize material, e.g., spilled food, from entering into the sensor finger 410 and/or the temperature sensor 450 embedded therein by the shoulder 423 and the heat transfer cap 456. For example, as illustrated in FIGS. 25 through 27, in some embodiments, the heat transfer cap 456 overhangs the raised shoulder 423. Such overhang may serve to prevent or minimize spilled material reaching the space within the interior of the sensor finger 410, e.g., the slot 414 wherein the temperature sensor 450 is disposed.

As may be seen in FIG. 27 in particular, the heat transfer cap 456 may remain spaced apart from, and thus thermally isolated from, the sensor finger 410, including the shoulder 423 thereof, even when the heat transfer cap 456 approaches the sensor finger 410 in the lowered position.

The temperature sensor 450 may also include a tubular sheath 462, and the tubular sheath 462 may extend between the rounded, e.g., partially spherical, tip 419 and a base 464 of the temperature sensor 450. Tubular sheath 462 may be a metal tubular sheath, such as an aluminum, copper, steel, or other suitable tube, such as a ceramic tube. A wire may extend through the tubular sheath 462 from the base 464, and the inherent resiliency of the wire may urge the temperature probe into the tapered recess 452 in the partially spherical tip 419, as described above.

The base 464 may be or include a pogo pin terminal block, e.g., the base 464 of the first temperature sensor 450 embedded in the first grate 400 may be or provide a third pogo pin terminal block, and the base 464 of the second temperature sensor 450 embedded in the second grate 402 may be or provide a fourth pogo pin terminal block, where the third and fourth pogo pin terminal blocks on the grates 400 and 402 may be connectable with the first pogo pin terminal block 150 and the second pogo pin terminal block 152 on the top panel 102. The wire 470 running through the tubular sheath 462 connects the temperature probe 454 within the tip 419 with the pogo pin connectors on the base 464 to place the probe 454 and base 464 in signal communication with each other. Thus, the wire 470 may transmit electrical signals between the temperature probe and base 464, such as a pogo pin terminal block and/or pogo pin connectors of the base 464. The wire 470 within tubular sheath 462 may be insulated for high temperatures, e.g., may include a woven fiberglass jacket or a woven steel mesh jacket in order to advantageously limit heat transfer, e.g., conductive heat transfer, between the tubular sheath 462 and the wire 470.

The base 464 of the temperature sensor 450 may be positioned at or within a socket 430 in the outer frame 406, e.g., adjoining the slot 414 at the second end 420 of the slot 414. Thus, the temperature sensor 450, e.g., the tubular sheath 462 thereof, may extend within the slot 414 and across the entire length of the slot 414 from the base 464 at the second end 420 of the slot 414 to the partially spherical tip 419 at the first end 424 of the slot 414, whereby the temperature sensor 450 may be embedded within the grate 400, e.g., within the socket 430 and the slot 414 of the sensor finger 410. As mentioned, the base 464 may include a pogo pin terminal block having pogo pin connectors, e.g., contact pads or spring-loaded pins. For example, the base 464 may include two contact pads 466 (see, e.g., FIG. 14) for connecting with spring-loaded pins 154 of the first pogo pin terminal block 150 or the spring-loaded pins 156 of the second pogo pin terminal block 152 when the grate 400 is mounted on the frame 200 and the frame 200 is mounted on the panel 102. In alternative example embodiments, the relative position of spring loaded pins and contact pads on first and second pogo pin terminal blocks 150, 152 and the base 464 of the temperature sensor 450 may be reversed.

As mentioned above, the cooktop appliance 100 may include a controller 130 and the first and second grates 400 and 402 may include first and second sensor fingers 410 and 412, respectively, with each having a temperature sensor 450 embedded therein. The temperature sensor(s) 450 may be selectively in operative communication with the controller 130, e.g., may be in operative communication with the controller 130 via a connection between the first and second pogo pin terminal blocks 150 and 152 on the panel 102 and respective pogo pin connectors on each of the grates 400 and 402 when the grates 400 and 402 are mounted on the frame 200 while the frame 200 is mounted on the panel 102.

In some embodiments, the temperature sensor 450 may be hermetically sealed. For example, the sheath 462 may be hermetically welded to the base 464. Also by way of example, the sheath 462 may be hermetically welded to the rounded tip 419. Such hermetic welding may include, e.g., laser welding. Any suitable welding technique may be used which results in a weld seam that is continuous around the interface or joint between the sheath 462 and the base 464 such that the weld seam provides a hermetic seal between the sheath 462 and the base 464. The sheath 462 may be hermetically welded to the tip 419 in the same or similar manner as described above with respect to the sheath 462 and the base 464.

In some embodiments, the temperature sensor 450 may also or instead be hermetically sealed in that each electrical contact, e.g., each contact pad 466, is hermetically sealed to or with the corresponding base 464, such as with a glass-to-metal seal or a ceramic-to-metal seal. The base 464, such as a bottom portion or a bottom plate 455 thereof, may be at least partially formed of a glass or ceramic material, such as the base 464 may include an insert or bushing 457 at the bottom plate 455 of the base 464 that is formed of a glass or ceramic material. The contact pads 466 may be formed of a metal material. Additionally, the base 464 may include one or more metal portions, e.g., a housing 459 and/or the bottom plate 455 of the base 464 may be formed of metal. For example, the bottom plate 455 may be formed entirely of glass or ceramic in some embodiments, or, in other embodiments, the bottom plate 455 may be formed of metal and the glass or ceramic insert 457 may be provided. Thus, in various embodiments, the hermetic seal formed in the base 464 may be or include a glass-to-metal seal or a ceramic-to-metal seal between the contact pads 466 and the insert 455 or bottom plate 457 of the base 464, and between the insert 455 or bottom plate 457 of the base 464 and the remainder of the base 464, e.g., the housing 459 of the base 464. When the bottom plate 455 and housing 459 are both formed of metal, the bottom plate 455 and housing 459 may be hermetically welded together. Such glass-to-metal seals or ceramic-to-metal seals may be formed by assembling the contact pads 466 within the glass or ceramic part (e.g., the bottom plate 455 or insert 457) and the glass or ceramic part within the remainder of the base 464 (e.g., the glass/ceramic bottom plate 455 within the housing 459 or the glass/ceramic insert 457 within the bottom plate 455) and fusing the assembled components in a furnace to create a gas-tight sealed base 464. The temperature in the furnace may be sufficiently high to cause the components to fuse together and fill in any gaps therebetween, resulting in a hermetically sealed assembly. The materials selected, e.g., whether the insert 457 or bottom plate 455 is glass or ceramic, may be based on compatibility for forming such seals with the metal material of the contact pads 466, e.g., based on the coefficients of thermal expansion of each material.

In some embodiments, the coefficients of thermal expansion may be matched, such that when the contact pads 466 and the insert or bottom plate are assembled as described above and then heated, the materials may be fused together to form a seal therebetween. In other embodiments, the coefficients of thermal expansion may be different, such that when so assembled and then heated, the metal components, e.g., the contact pads 466, may expand faster than the glass or ceramic parts, causing the components to press together as the assembly is heated, thereby forming a compressive seal between the components.

Figure 15:
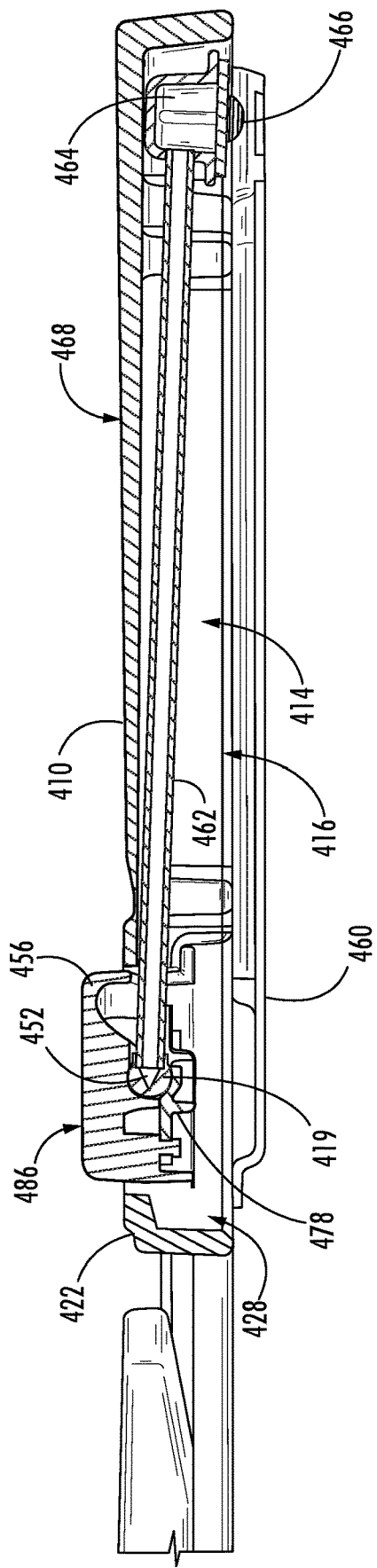
FIG. 15 provides a section view of a grate and a temperature sensor embedded therein in an unloaded position.
Figure 16:
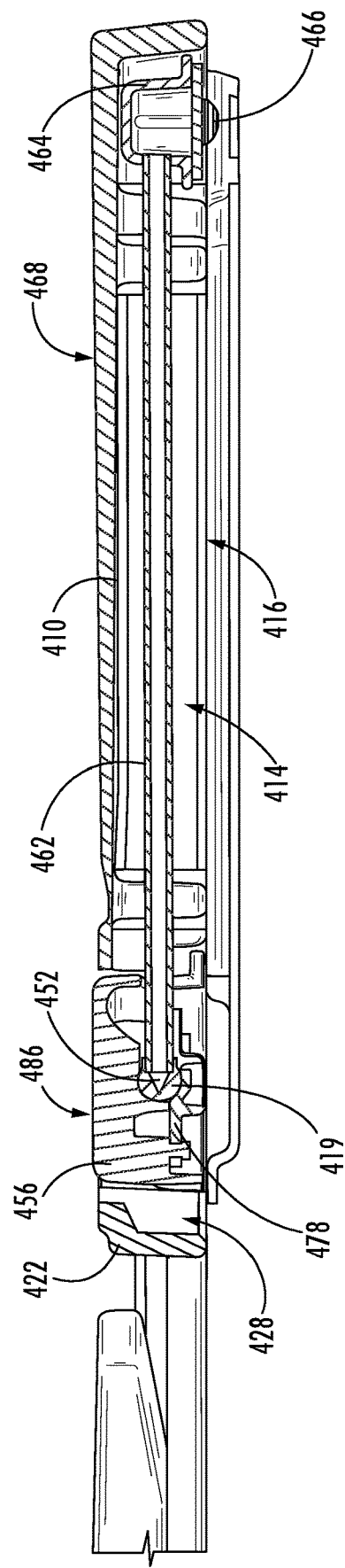
FIG. 16 provides a section view of the grate and temperature sensor of FIG. 15 in a loaded position.
Figure 17:
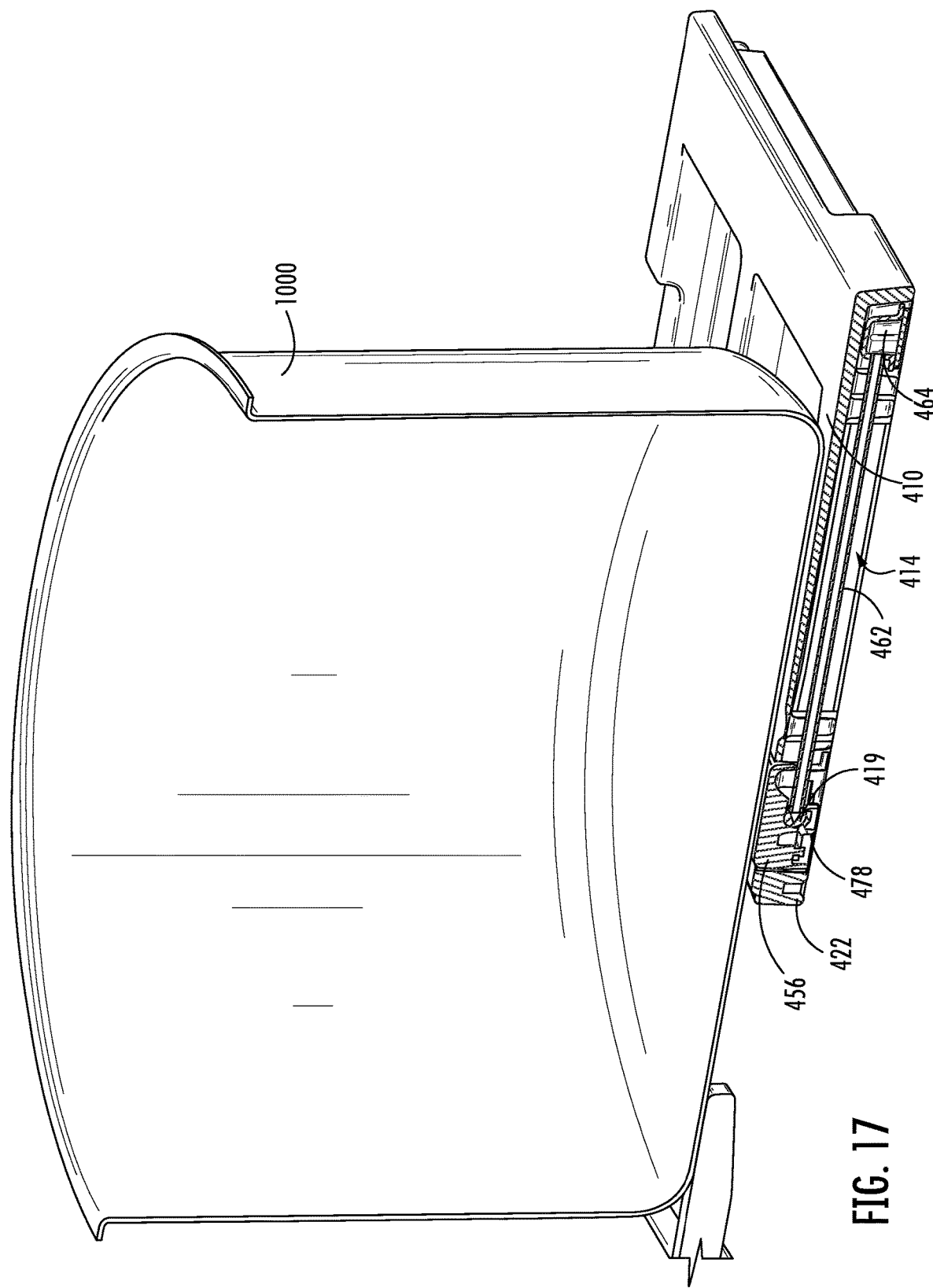
FIG. 17 provides a section view of the grate and temperature sensor and a load thereon.

In some embodiments, the temperature sensor 450 may be rotatably, e.g., hingedly, mounted to the sensor finger 410. Thus, the temperature sensor 450 may be rotatable such that the temperature sensor 450 moves along the vertical direction V between an elevated position and a lowered position. For example, FIGS. 15 and 26 illustrate the temperature sensor 450 in an unloaded, elevated position, and FIGS. 16 and 27 illustrate the temperature sensor 450 in a loaded, lowered position. For example, the temperature sensor 450 may be biased towards the elevated position by one or more biasing elements 480, e.g., a coil spring (FIG. 9) or one or more leaf springs (FIG. 22), such that the temperature sensor 450 is in the elevated position when the temperature sensor 450 is unloaded, e.g., when the cooking utensil 1000 (FIG. 17) is not present. When the cooking utensil 1000 is placed on the grate 400, the weight of the utensil 1000 and contents thereof overcomes the force of the biasing element 480 to move the temperature sensor 450 to the lowered position.

As may be seen, e.g., in FIGS. 15, 16, 26, and 27, the heat transfer cap 456 and the tip 419 of the temperature sensor 450 translate together along the vertical direction between the elevated position and the lowered position. The sheath 462 of the temperature sensor 450 may touch an inner, lower surface of the sensor finger 410 in the elevated position, whereas the sheath 462 rotates down and away from contact with the sensor finger 410, e.g., the sheath 462 rotates within the slot 414, when in the loaded, lower position. Thus, the temperature sensor 450, and in particular the sheath 462 thereof, may be separated from conductive thermal communication with the sensor finger 410 when in use, e.g., when a cooking utensil 1000 is placed on the grate 400 for cooking food items therein. Accordingly, the temperature sensor 450 may more accurately measure temperature of the cooking utensil 1000, e.g., the temperature sensor 450 is less heated or influenced by the grate 400, including the sensor finger 410 thereof when the temperature sensor 450 is spaced apart from the sensor finger 410 in the loaded position.

Figure 22:
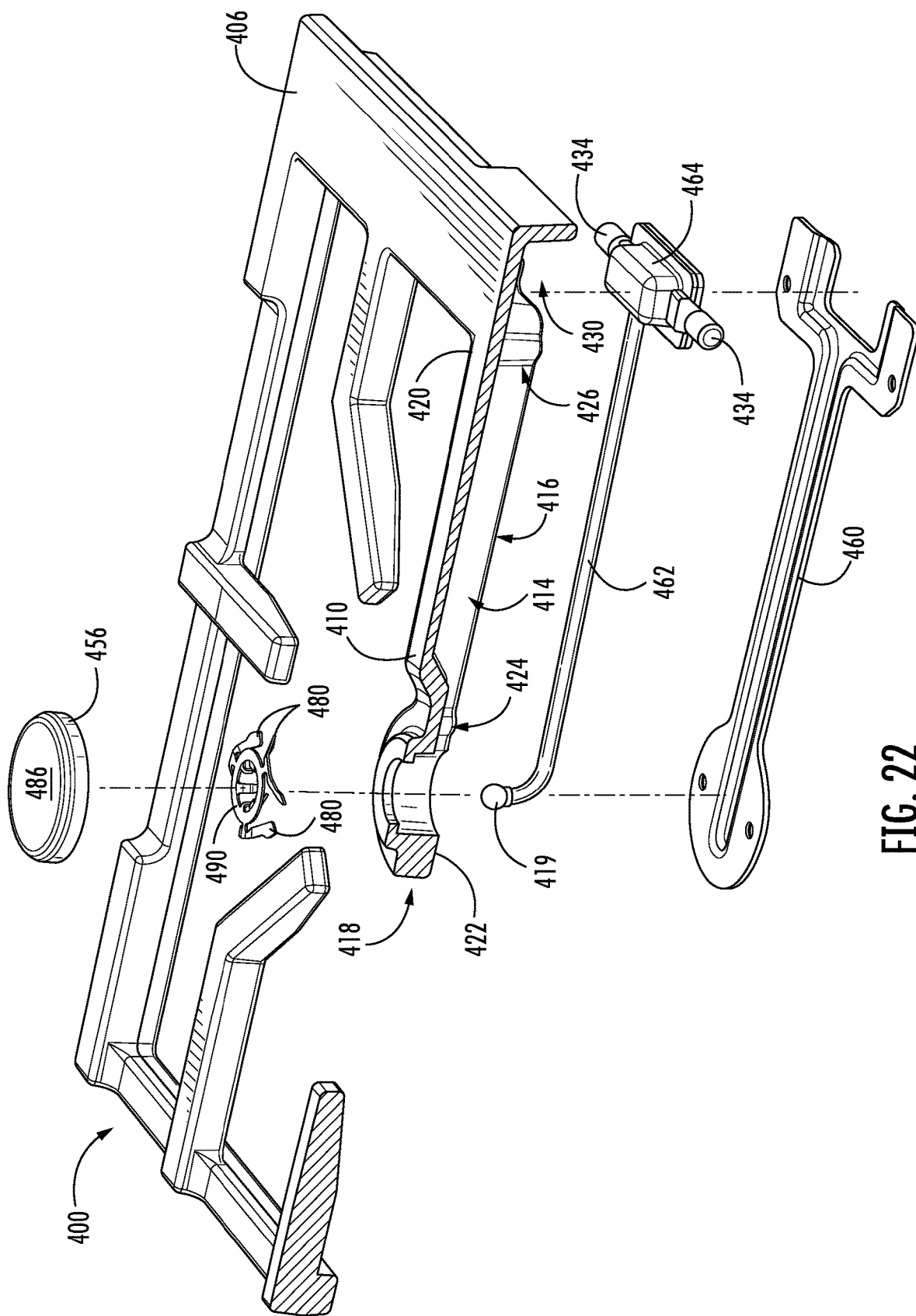
FIG. 22 provides a partially sectioned exploded perspective view of the grate of FIG. 19.
Figure 23:
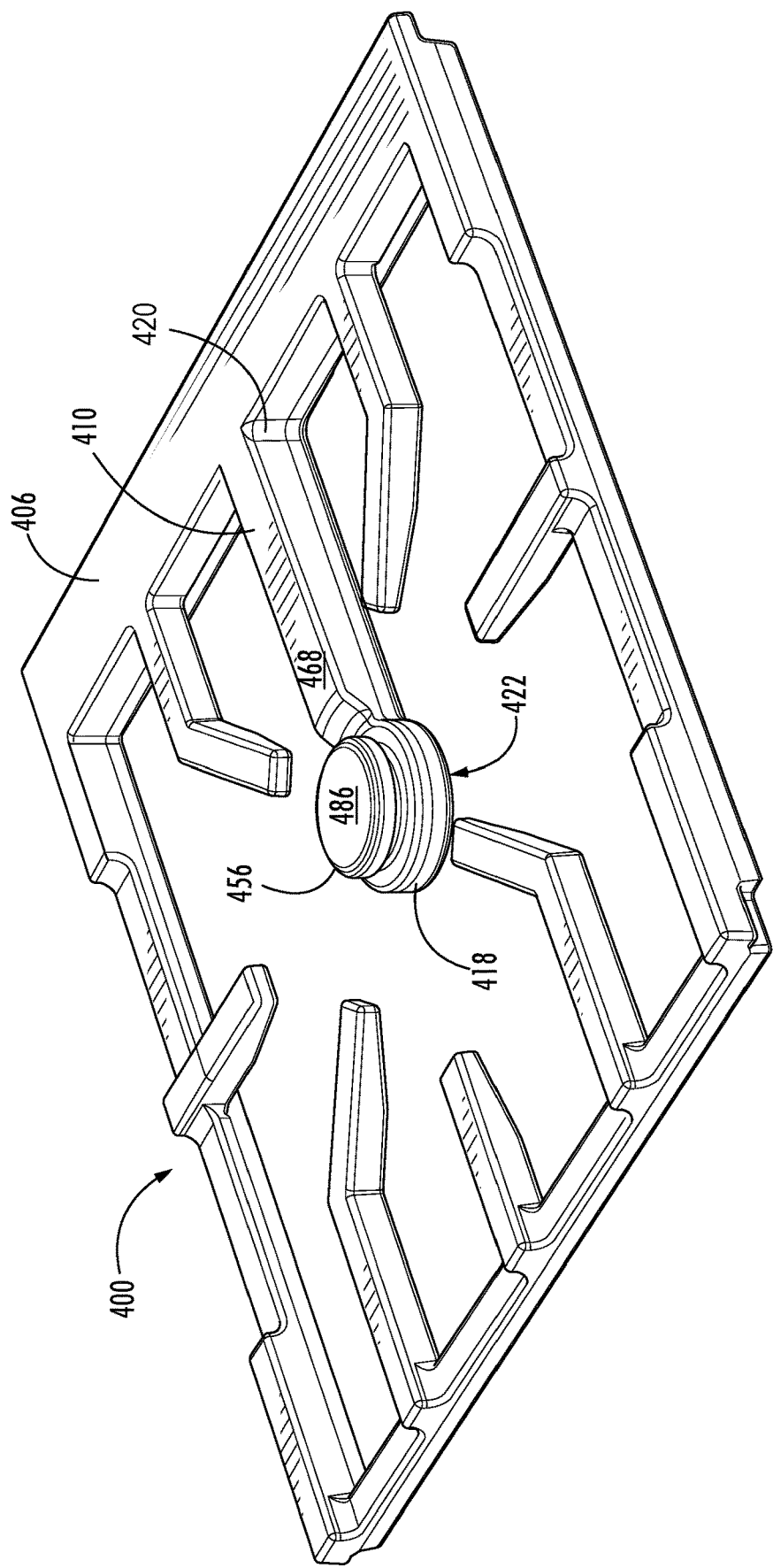
FIG. 23 provides a top perspective view of the grate of FIG. 19.
Figure 24:
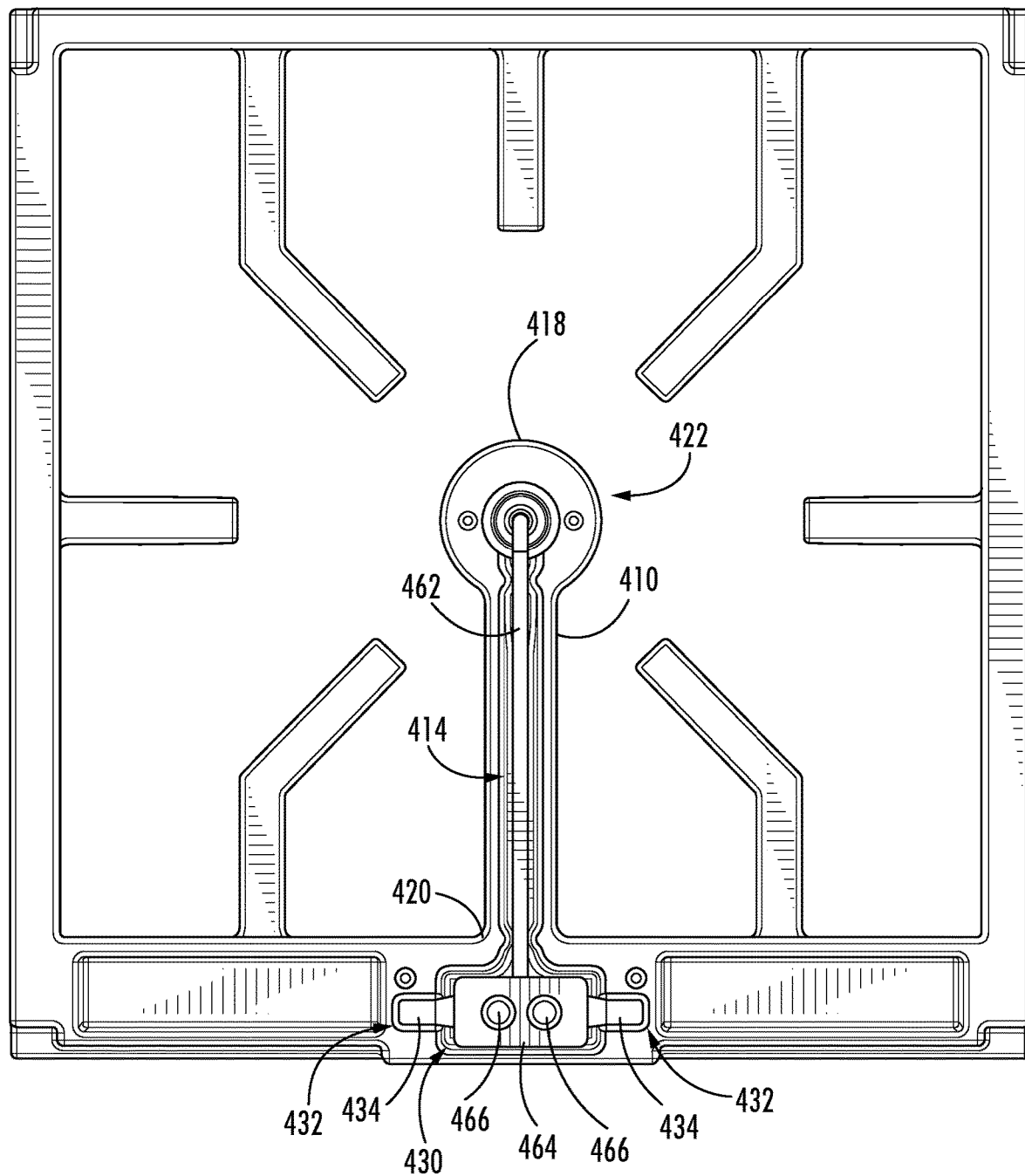
FIG. 24 provides a bottom view of the grate of FIG. 19.

As may be seen, e.g., in FIGS. 9, 20, and 22, the temperature sensor 450 may include a pair of hinge pins 434, e.g., a first hinge pin 434 on a first side of the base 464 of the temperature sensor 450 and a second hinge pin 434 on a second side of the base 464 of the temperature sensor 450 opposite the first side of the base 464 of the temperature sensor 450. The hinge pins 434 may be colinear and may define a hinge axis about which the temperature sensor 450 rotates. For example, the base 464 may be received in the socket 430 within the outer frame 406 of the grate 400 and each hinge pin 434 may be received within a corresponding recess 432 adjoining the socket 430. In this way, the temperature sensor 450 may be permitted to rotate about the hinge axis defined by the colinear hinge pines 434, while being restrained from rotation about a longitudinal axis of the temperature sensor 450. The longitudinal axis of the temperature sensor 450 may be, e.g., generally perpendicular to the hinge axis defined by the colinear hinge pins 434. For example, the longitudinal axis of the temperature sensor 450 may be defined by a major (largest and/or longest) dimension of the sheath 462.

The hinge pins 434 may be colinear along a direction that is generally perpendicular to the vertical direction V, e.g., one of the lateral direction L and the transverse direction T. For example, in the illustrated embodiments, the hinge axis is generally parallel to the transverse direction T. Thus, the temperature sensor 450 may be mounted to the sensor finger 410 (and the grate 400 in general) such that the temperature sensor 450 is rotatable about a first direction perpendicular to the vertical direction V, e.g., the transverse direction T, while being constrained against rotation about a second direction perpendicular to the vertical direction V and the first direction, such as the lateral direction L.

When the base 464 and the hinge pins 434 are received in the socket 430 and the recesses 432 respectively, and the cover 460 is coupled, e.g., fastened, to the grate 400, the base 464 and the hinge pins are thereby at least partially enclosed within and between the grate 400 and the cover 460, thus mounting and constraining the temperature sensor 450 within and to the sensor finger 410 as described above. Thus, the temperature sensor 450 is supported by the base 464 thereof. For example, the sheath 462 and the tip 419 of the temperature sensor 450 may be cantilevered from the base 464 of the temperature sensor 450. Thus, the temperature sensor 450 may be supported by the outer frame 406 of the grate 400, where the outer frame 406 is spaced apart from the burner 110 and thus the outer frame 406 receives less heat from the burner 110 than does the sensor finger 410, especially the first end portion 422 of the sensor finger 410 in which the probe 454 of the temperature sensor 450 is located. Thus, the cantilevered arrangement of the temperature sensor 450 may promote thermal isolation of the temperature sensor 450 from the sensor finger 410, e.g., where the temperature sensor 450 is supported at the base 464 in the outer frame 406 of the grate, and the remaining portions of the temperature sensor 450, e.g., the sheath 462 and tip 419, are suspended, e.g., cantilevered from the base 464, within the slot 414 of the sensor finger 410, such that when the sensor finger 410 is heated by the burner 110 such heat is not conductively transferred to the temperature sensor 450, e.g., at the first end portion 422, such as is not directly conductively transferred to the temperature sensor 450 from the sensor finger 410.

The construction of the sensor finger 410 and temperature sensor 450 as described herein provides numerous advantages. For example, temperature sensor 450 is advantageously positioned proximate a cooking utensil on the grate 400 yet temperature sensor 450 is also shielded by sensor finger 410 and cover 460 from direct convective heating from gas burner 110. As another example, providing pogo pin terminal blocks, e.g., the base 464 of the or each temperature sensor 450 having pogo pin connectors thereon, also allows grates 400 and 402 to be removed from the panel 102 without the need to manually disconnect any wiring. Such pogo pin connections may also accommodate variation in positioning of grates 400 and 402 on panel 102 while also maintaining good electrical signal. Thus, the grates 400 and 402 with the temperature sensors 450 therein may be easily removed by a user while the temperature sensor 450 remains in each grate 400 and 402. For example, the grates 400 and 402 may be removed for cleaning, including washing, such as submerging in a sink or in a dishwasher appliance. When the temperature sensor 450 is hermetically sealed, e.g., with hermetic welds and/or glass-to-metal seals as described above, the temperature sensor 450 may thereby be washed with the grate 400 or 403, including may be submerged and/or run through the dishwasher, without exposing the internal electrical components of the temperature sensor 450 to undesirable moisture. Further, as may be seen, e.g., in FIG. 8, the contact pads 466 may rub or wipe against the pogo pins, e.g., pins 154, as the temperature sensor 450 rotates. Such wiping may advantageously clean the contact pads 466, e.g., the contact pads 466 may be formed of a stainless steel material and a patina or film which may accumulate on the stainless steel material, e.g., as a result of washing in the dishwasher, may thereby be wiped off. Thus, the glass-to-metal seal (or ceramic-to-metal seal) as described above may be accomplished with readily available and inexpensive materials, e.g., stainless steel for the metal, as opposed to more exotic metal materials or metal platings. The foregoing advantages are described by way of example only and without limitation. Additional advantages of the present disclosure may also be apparent to those of ordinary skill in the art.

The cooktop appliance 100 shown in the accompanying figures and described herein illustrates various example embodiments of the present disclosure. Thus, although described in the context of cooktop appliance 100, the present disclosure may be used in cooktop appliances having other configurations, e.g., a cooktop appliance with fewer burner assemblies or additional burner assemblies. Similarly, the present disclosure may be used in cooktop appliances that include an oven, i.e., range appliances. As another example, the present disclosure may be used with a cooktop appliance without a separate frame or frames, e.g., where the grate(s) may be positioned directly on the top panel, such as grates 400 and/or 402 may include vertical portions, such as legs, and may be positioned directly on panel 102. Additional other and further variations in the configuration of the cooktop appliance 100 as will be understood by those of ordinary skill in the art are also contemplated as being within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas burner assembly, comprising:
a gas burner;
a grate comprising a plurality of fingers positioned above the gas burner, the plurality of fingers including a sensor finger; and
a temperature sensor mounted to the sensor finger of the plurality of fingers of the grate, the temperature sensor comprising a base, a sheath, and a tip, wherein the temperature sensor is mounted to the sensor finger at the base of the temperature sensor, and wherein the sheath and tip of the temperature sensor are cantilevered from the base of the temperature sensor;
wherein the temperature sensor is thermally isolated from the sensor finger.

2. The gas burner assembly of claim 1, wherein the temperature sensor comprises a probe in conductive thermal communication with a heat transfer cap.

3. The gas burner assembly of claim 2, wherein the heat transfer cap is spaced apart from the sensor finger continuously around a circumference of the heat transfer cap.

4. The gas burner assembly of claim 2, wherein the heat transfer cap faces away from the gas burner and is configured to contact a cooking utensil positioned on the grate.

5. The gas burner assembly of claim 4, further comprising a biasing element configured to bias the heat transfer cap upwards into an elevated position.

6. The gas burner assembly of claim 5, wherein the temperature sensor is rotatably mounted to the sensor finger whereby the temperature sensor is configured to pivot to a lowered position from the elevated position when the cooking utensil is positioned on the grate, wherein the temperature sensor comprises a base, a sheath, and a tip, and wherein each of the base, the sheath, and the tip of the temperature sensor is spaced apart from the sensor finger of the grate when the temperature sensor is in the lowered position.

7. The gas burner assembly of claim 2, wherein the sensor finger extends from a first end portion to a second end portion, wherein the temperature sensor comprises a base, a sheath, and a tip, wherein the first end portion of the sensor finger defines a first diameter and the heat transfer cap defines a second diameter, and wherein the second diameter is less than the first diameter.

8. The gas burner assembly of claim 7, wherein the first end portion of the sensor finger comprises a raised shoulder and wherein the heat transfer cap overhangs the raised shoulder of the first end portion of the sensor finger.

9. The gas burner assembly of claim 2, wherein the sensor finger extends from a first end portion to a second end portion, wherein the first end portion of the sensor finger comprises an aperture defining an inner diameter, wherein the heat transfer cap defines an outer diameter, and wherein the outer diameter of the heat transfer cap is less than the inner diameter of the aperture.

10. A cooktop appliance, comprising:
a top panel
a gas burner positioned on the top panel;
a grate having a plurality of fingers positioned above the gas burner, the plurality of fingers including a sensor finger; and
a temperature sensor mounted to the sensor finger of the plurality of fingers of the grate, the temperature sensor comprising a base, a sheath, and a tip, wherein the temperature sensor is mounted to the sensor finger at the base of the temperature sensor, and wherein the sheath and tip of the temperature sensor are cantilevered from the base of the temperature sensor;
wherein the temperature sensor is thermally isolated from the sensor finger.

11. The cooktop appliance of claim 10, wherein the temperature sensor comprises a probe in conductive thermal communication with a heat transfer cap.

12. The cooktop appliance of claim 11, wherein the heat transfer cap is spaced apart from the grate continuously around a circumference of the heat transfer cap.

13. The cooktop appliance of claim 11, wherein the heat transfer cap faces away from the gas burner and is configured to contact a cooking utensil positioned on the grate.

14. The cooktop appliance of claim 13, further comprising a biasing element configured to bias the heat transfer cap upwards into an elevated position.

15. The cooktop appliance of claim 14, wherein the temperature sensor is rotatably mounted to the sensor finger whereby the temperature sensor is configured to pivot to a lowered position from the elevated position when the cooking utensil is positioned on the grate, wherein the temperature sensor comprises a base, a sheath, and a tip, and wherein each of the base, the sheath, and the tip of the temperature sensor is spaced apart from the sensor finger of the grate when the temperature sensor is in the lowered position.

16. The cooktop appliance of claim 11, wherein the sensor finger extends from a first end portion to a second end portion, wherein the temperature sensor comprises a base, a sheath, and a tip, wherein the first end portion of the sensor finger defines a first diameter and the heat transfer cap defines a second diameter, and wherein the second diameter is less than the first diameter.

17. The cooktop appliance of claim 16, wherein the first end portion of the sensor finger comprises a raised shoulder and wherein the heat transfer cap overhangs the raised shoulder of the first end portion of the sensor finger.

18. The cooktop appliance of claim 11, wherein the sensor finger extends from a first end portion to a second end portion, wherein the first end portion of the sensor finger comprises an aperture defining an inner diameter, wherein the heat transfer cap defines an outer diameter, and wherein the outer diameter of the heat transfer cap is less than the inner diameter of the aperture.

19. A cooktop appliance, comprising:
a top panel
a gas burner positioned on the top panel;
a grate having a plurality of fingers positioned above the gas burner, the plurality of fingers including a sensor finger; and
a temperature sensor mounted to the sensor finger of the plurality of fingers of the grate, the temperature sensor comprising a base, a sheath, a tip, and a probe in conductive thermal communication with a heat transfer cap;
wherein the temperature sensor is thermally isolated from the sensor finger, wherein the sensor finger extends from a first end portion to a second end portion, wherein the first end portion of the sensor finger defines a first diameter and the heat transfer cap defines a second diameter, and wherein the second diameter is less than the first diameter.

20. The cooktop appliance of claim 19, wherein the first end portion of the sensor finger comprises a raised shoulder and wherein the heat transfer cap overhangs the raised shoulder of the first end portion of the sensor finger.

* * * * *